United States Patent
Ogawa et al.

(10) Patent No.: US 8,980,498 B2
(45) Date of Patent: *Mar. 17, 2015

(54) FUEL CELL STACK

(75) Inventors: Tetsuya Ogawa, Wako (JP); Kimiko Fujisawa, Wako (JP); Ayatoshi Yokokawa, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 455 days.

This patent is subject to a terminal disclaimer.

(21) Appl. No.: 13/380,264

(22) PCT Filed: Sep. 1, 2010

(86) PCT No.: PCT/JP2010/065364
§ 371 (c)(1),
(2), (4) Date: Dec. 22, 2011

(87) PCT Pub. No.: WO2011/030769
PCT Pub. Date: Mar. 17, 2011

(65) Prior Publication Data
US 2012/0100452 A1    Apr. 26, 2012

(30) Foreign Application Priority Data

Sep. 8, 2009   (JP) ................................ 2009-207305

(51) Int. Cl.
*H01M 8/24* (2006.01)
*H01M 8/02* (2006.01)
(Continued)

(52) U.S. Cl.
CPC .......... *H01M 8/2425* (2013.01); *H01M 8/0247* (2013.01); *H01M 8/248* (2013.01); *H01M 2008/1293* (2013.01); *Y02E 60/50* (2013.01); *Y02E 60/525* (2013.01)

USPC ........... 429/455; 429/505; 429/535; 429/457; 429/458; 429/471; 429/495

(58) Field of Classification Search
None
See application file for complete search history.

(56) References Cited

U.S. PATENT DOCUMENTS

2002/0034673 A1    3/2002   Bisaka et al.
2004/0028986 A1*   2/2004   Tsunoda ......................... 429/38
(Continued)

FOREIGN PATENT DOCUMENTS

JP   2000-323155   11/2000
JP   2006-120589   5/2006
(Continued)

OTHER PUBLICATIONS

Search Report, Application No. PCT/JP2010/065365, mailed Dec. 23, 2010, 3 pages.
(Continued)

*Primary Examiner* — Barbara Gilliam
*Assistant Examiner* — Angela Martin
(74) *Attorney, Agent, or Firm* — Rankin, Hill & Clark LLP

(57) ABSTRACT

The present invention provides a fuel cell stack that has a separator arranged between fuel cells, the separator including: a sandwiching section which sandwiches an electrolyte electrode assembly and includes a fuel gas channel and a separately provided oxygen-containing gas channel; a bridge which is connected to the sandwiching section and includes a reactant gas supply channel; a reactant gas supply section which is connected to the bridge and includes a reactant gas supply passage; and a connecting section that connects the sandwiching section to the bridge.

33 Claims, 15 Drawing Sheets

(51) Int. Cl.
*H01M 2/14* (2006.01)
*H01M 8/04* (2006.01)
*H01M 8/00* (2006.01)
*H01M 8/12* (2006.01)

(56) References Cited

U.S. PATENT DOCUMENTS

| | | | |
|---|---|---|---|
| 2004/0234836 A1* | 11/2004 | Orishima et al. | 429/38 |
| 2005/0142423 A1* | 6/2005 | Homma et al. | 429/38 |
| 2007/0111068 A1 | 5/2007 | Gudlavalleti et al. | |
| 2008/0124608 A1* | 5/2008 | Yamamura | 429/34 |
| 2009/0169973 A1* | 7/2009 | Yamamura et al. | 429/38 |
| 2010/0092837 A1 | 4/2010 | Akbay et al. | |
| 2010/0209820 A1 | 8/2010 | Akbay et al. | |

FOREIGN PATENT DOCUMENTS

| | | | | |
|---|---|---|---|---|
| JP | 2008-218278 | * | 9/2008 | H01M 8/02 |
| JP | 2008-251236 | * | 10/2008 | H01M 8/02 |
| JP | 2008-251239 | * | 10/2008 | H01M 8/02 |
| WO | 2009/044752 A2 | | 4/2009 | |
| WO | WO 2009044752 | * | 4/2009 | |
| WO | 2009/093622 | | 7/2009 | |
| WO | WO 2009093622 | * | 7/2009 | H01M 8/02 |

OTHER PUBLICATIONS

U.S. Office Action, U.S. Appl. No. 13/384,714, dated Jun. 28, 2013, 36 pages.

* cited by examiner

⇨ OXYGEN-CONTAINING GAS
⇨ FUEL GAS

⇨ OXYGEN-CONTAINING GAS
⇨ FUEL GAS

⇨ OXYGEN-CONTAINING GAS
⇨ FUEL GAS

⇨ OXYGEN-CONTAINING GAS
⇨ FUEL GAS

⇨ OXYGEN-CONTAINING GAS
⇨ FUEL GAS ial direction of a circumferential edge of the bridge, stress (warping force) in the in-plane directions of the bridge acts in the tangential
FUEL CELL STACK

TECHNICAL FIELD

The present invention relates to a fuel cell stack in which an electrolyte electrode assembly is stacked between separators in a stacking direction to form a fuel cell. The electrolyte electrode assembly includes an anode, a cathode, and an electrolyte interposed therebetween.

The present application claims priority on Japanese Patent Application No. 2009-207305, filed Sep. 8, 2009, the content of which is incorporated herein by reference.

BACKGROUND ART

Usually, a solid electrolyte fuel cell (SOFC) uses an oxide-ion conductor, e.g. stabilized zirconia, as an electrolyte; an anode and a cathode are provided on both sides of this electrolyte to form an electrolyte electrode assembly (MEA), which is then sandwiched between separators (bipolar plates). This fuel cell is usually used as a fuel cell stack formed by stacking a predetermined number of electrolyte-electrode assemblies and separators.

Recently, a flat-plate seal-less solid electrolyte fuel cell is being developed.

Compared to a sealed fuel cell, this solid electrolyte fuel cell has advantages such as a simpler structure, and less load on the electrolyte electrode assembly.

Patent Documents 1 to 3 disclose technologies for imparting flexibility corresponding to a load on a connecting section that links a manifold section of a separator and a section where a power-generation cell is provided. Consequently, the load on the separator can be divided between the manifold section and the section where the power-generation cell is provided, such that an appropriate load is applied to each.

RELATED ART DOCUMENTS

Patent Document 1
Japanese Unexamined Patent Application, First Publication No. 2006-120589
Patent Document 2
Japanese Unexamined Patent Application, First Publication No. 2008-218278
Patent Document 3
Japanese Unexamined Patent Application, First Publication No. 2008-251236

DISCLOSURE OF INVENTION

Technical Problem

The abovementioned solid electrolyte fuel cell is a high-temperature fuel cell, in which, when generating power, the temperature of the fuel cell stack rises to approximately 600 degrees to 800 degrees. Due to this heat, the separator expands and contracts, thereby generating a stress (heat stress) along the plane surface. The configurations disclosed in Patent Documents 1 to 3 mentioned above cannot tolerate stress along the plane surface, so that stress particularly concentrates in the connection section that links the manifold section of the separator and the section where the power-generation cell is provided, and in bends in the connection section. As a result, the separator will suffer thermal distortion and the like, and will deform in the stacking direction of the fuel cell.

If the separator deforms in the stacking direction of the fuel cell, a gap will occur between the separator and the power-generation cell, reducing the adhesion between them, making it impossible to efficiently collect the power generated by the power-generation cell, and leading to a deterioration in power generation performance. Further, the separator will apply an unbalanced load to the power-generation cell, damaging its durability. Moreover, the connection section between the manifold section and the power-generation cell will deform. In that case, the flow path of reactant gas (fuel gas, oxygen-containing gas) between the manifold section and the power-generation cell closes or breaks, and a desired quantity of the reactant gas can no longer be supplied to the power-generation cell.

Accordingly, it is an object of the invention to provide a fuel cell stack that can suppress distortion of the separator due to expansion and contraction caused by heat, and increase power generation efficiency and durability.

Technical Solution

The invention employs the following configurations.
(1) One aspect of the invention is a fuel cell stack in which an electrolyte electrode assembly is stacked between separators in a stacking direction to form a fuel cell, the electrolyte electrode assembly including an anode, a cathode, and an electrolyte interposed between the anode and the cathode, each of the separators including: a sandwiching section, which sandwiches the electrolyte electrode assembly and includes a fuel gas channel that supplies fuel gas to an electrode face of the anode and a separately provided oxygen-containing gas channel that supplies oxygen-containing gas to an electrode face of the cathode, the fuel gas and the oxygen-containing gas being discharged after use from a circumferential edge of the electrolyte electrode assembly; a bridge which is connected to the sandwiching section and includes a reactant gas supply channel that supplies the fuel gas to the fuel gas channel or the oxygen-containing gas to the oxygen-containing gas channel; a reactant gas supply section which is connected to the bridge and includes a reactant gas supply passage that supplies the fuel gas or the oxygen-containing gas to the reactant gas supply channel, the reactant gas supply passage being formed in a stacking direction of the separator; and a connecting section that connects the sandwiching section to the bridge such that a tangential direction of a circumferential edge of the sandwiching section is substantially same as a tangential direction of a circumferential edge of the bridge.

According to this configuration, between the reactant gas supply section and the sandwiching section, the tightening load in the stacking direction is shut off via the bridge. Consequently, a desired load can be applied to the electrolyte electrode assembly. This makes it possible, using a simple and compact configuration, to apply a comparatively large load to a portion that demands sealability (the reactant gas supply section), and apply a comparatively small load, being sufficient to increase adhesion with the sandwiching section, to the electrolyte electrode assembly. Therefore, the desired sealability is achieved; in addition, damage to the electrolyte electrode assembly can be prevented as much as possible, achieving efficient generation and collection of power.

Since the connecting section between the sandwiching section and the bridge is connected such that the tangential direction of the circumferential edge of the sandwiching section is substantially same as the tangential direction of the circumferential edge of the bridge, stress (warping force) in the in-plane directions of the bridge acts in the tangential direction of the sandwiching section and is converted to a rotational force in the circumferential directions of the sandwiching section. That is, since the sandwiching section rotates slightly, it can absorb the stress acting on the bridge, and can suppress concentration of stress in the connecting section.

Therefore, since warping of the separator resulting from expansion and contraction due to heat can be suppressed, adhesion between the separator and the electrolyte electrode assembly can be maintained, and power can be generated and collected efficiently. Moreover, since no unbalanced load from the separator acts on the electrolyte electrode assembly, the durability of the electrolyte electrode assembly can be increased, and damage to it can be prevented. Furthermore, since deformation of the reactant gas bridge can be prevented, a desired quantity of reactant gas can be supplied to the electrolyte electrode assembly at all times, thereby stabilizing the power generation efficiency.

(2) In the fuel cell stack described in (1), the sandwiching section may be formed in a shape of a circular disk; and the bridge may have a shape with a circular arc that is larger than a circular arc of the sandwiching section.

According to this configuration, since stress in the in-plane directions of the bridge is transmitted to the tangential direction of the circular arc of the bridge, and is easily converted to rotational force in the circumferential directions of the separator in the sandwiching section, warping of the separator resulting from expansion and contraction due to heat can be suppressed.

(3) In the fuel cell stack described in (1) or (2), the bridge and the reactant gas supply section may be connected such that a tangential direction of a circumferential edge of the bridge is substantially same as a tangential direction of a circumferential edge of the reactant gas supply section.

According to this configuration, some of the stress in the in-plane directions of the bridge also acts on the reactant gas supply section. In this case, the stress in the in-plane directions of the bridge acts in the tangential direction of the reactant gas supply section, and is converted to a rotational force in the circumferential directions of the reactant gas supply section. That is, since the sandwiching section rotates slightly, it can absorb the stress acting on the bridge and suppress concentration of stress in the connecting section, whereby warping of the separator resulting from expansion and contraction due to heat can be suppressed.

(4) In the fuel cell stack described in one of (1) to (3), the reactant gas supply section may be formed in a shape of a circular disk; and the bridge may have a shape with a circular arc that is larger than a circular arc of the reactant gas supply section.

According to this configuration, some of the stress in the in-plane directions of the bridge is transmitted to the tangential direction of the circular arc of the bridge, and is easily converted to a rotational force in the circumferential directions of the separator in the reactant gas supply section, whereby warping of the separator resulting from expansion and contraction due to heat can be suppressed.

(5) In the fuel cell stack described in one of (1) to (4), the sandwiching section may include: a fuel gas supply inlet that supplies the fuel gas to the fuel gas channel; a first circumferential protrusion which is formed on a circumferential edge of the fuel-gas channel and contacts a circumferential edge of the anode; fuel gas outlets that discharge the fuel gas from the fuel gas channel; an oxygen-containing gas supply inlet that supplies the oxygen-containing gas to the oxygen-containing gas channel; a second circumferential protrusion which is formed on a circumferential edge of the oxygen-containing gas channel and contacts a circumferential edge of the cathode; and oxygen-containing gas outlets that discharge the oxygen-containing gas from the oxygen-containing gas channel, the fuel gas outlets may be arranged in point-symmetrical formation with respect to a central point of the sandwiching section, and the oxygen-containing gas outlets may be arranged in point-symmetrical formation with respect to the central point of the sandwiching section.

According to this configuration, the first circumferential protrusion prevents fuel gas supplied from the fuel gas supply inlet to the fuel gas channel from being blown outside. Therefore, the fuel gas can be used effectively for power-generation reaction, increasing the fuel utilization efficiency. Moreover, oxygen-containing gas and other gas such as exhaust gas can be prevented from entering the anode from outside the electrolyte electrode assembly. Consequently, a decrease in the power generation efficiency due to oxidization of the anode is prevented, and the durability of the separator and the electrolyte electrode assembly is easily increased.

Furthermore, the second circumferential protrusion prevents oxygen-containing gas supplied from the oxygen-containing gas supply inlet to the oxygen-containing gas channel from being blown outside. Therefore, the oxygen-containing gas can be used effectively for power-generation reaction. Moreover, fuel gas and other gas such as exhaust gas can be prevented from entering the anode from outside the electrolyte electrode assembly. Consequently, a decrease in the power generation efficiency due to reduction of the cathode is prevented, and the durability of the separator and the electrolyte electrode assembly is easily increased.

The first circumferential protrusion and the second circumferential protrusion achieve good power collection. Moreover, between the first circumferential protrusion and the second circumferential protrusion, the load in the stacking direction can be reliably transmitted, and the adhesion between the separator and the electrolyte electrode assembly can be increased, thereby achieving good power collection and increasing the power generation efficiency.

Since one of the fuel gas outlets and another of the fuel gas outlets are in point-symmetrical formation with respect to the central point of the sandwiching section, and one of the oxygen-containing gas outlets and another of the oxygen-containing gas outlets are in point-symmetrical formation with respect to the central point of the sandwiching section, the reactant gas (fuel gas, oxygen-containing gas) can, after use (including reacted and unreacted), be discharged without fluctuation and roughly uniformly from the circumferential edge of the sandwiching section. Therefore, since difference in temperature distribution in and around the sandwiching section can be suppressed, expansion and contraction due to heat can be made roughly uniform without fluctuation, and stress from the separators can be prevented from concentrating in one place.

(6) In the fuel cell stack described in (5), the fuel gas outlets and the oxygen-containing gas outlets may be arranged in different phases.

According to this configuration, since the fuel gas outlets and the oxygen-containing gas supply outlets are arranged in different phases, oxygen-containing gas and other gas such as exhaust gas can be prevented from entering the anode from outside the electrolyte electrode assembly. Consequently, a decrease in the power generation efficiency due to oxidization of the anode is prevented, and the durability of the separator and the electrolyte electrode assembly is easily increased.

Furthermore, fuel gas and other gas such as exhaust gas can be prevented from entering the anode from outside the electrolyte electrode assembly. Consequently, a decrease in the power generation efficiency due to reduction of the cathode is prevented, and the durability of the separator and the electrolyte electrode assembly is easily increased.

Moreover, since the discharged (unused) fuel gas and (unused) oxygen-containing gas burn around the sandwiching section, the fuel cell (sandwiching section) can be heated beforehand, increasing the thermal efficiency and aiding thermal self-sustenance. Here, thermal self-sustenance denotes a state where the fuel cell maintains its operating temperature using only heat generated by itself, without heat being applied from the outside.

(7) In the fuel cell stack described in (5) or (6), the total opening sectional area of the fuel gas outlets may be smaller than the total opening sectional area of the oxygen-containing gas outlets.

(8) In the fuel cell stack described in one of (5) to (7), the number of the fuel gas outlets may be smaller than the number of the oxygen-containing gas outlets.

According to these configurations, in a fuel cell usually operating at A/F>1, the pressure difference and pressure loss difference between the fuel gas and the oxygen-containing gas decreases. Consequently, oxygen-containing gas and other gases such as exhaust gas from outside the electrolyte electrode assembly can be further prevented from entering the anode, and fuel gas and other gases such as exhaust gas from outside the electrolyte electrode assembly can be further prevented from entering the cathode. This easily increases the durability of the separator and the electrolyte electrode assembly.

(9) In the fuel cell stack described in one of (5) to (8), the fuel gas outlets may be spaced apart at an equiangular interval and arranged radially from the central point of the sandwiching section.

(10) In the fuel cell stack described in one of (5) to (9), the oxygen-containing gas outlets may be spaced apart at an equiangular interval and arranged radially from the central point of the sandwiching section.

According to these configurations, the fuel gas spreads through the entirety of the anode, and the discharge of used fuel gas is not biased to a specific fuel gas outlet. Furthermore, the oxygen-containing gas spreads through the entirety of the cathode, and the discharge of used oxygen-containing gas is not biased to a specific oxygen-containing gas outlet. Consequently, during power-generation, a power-generation difference due to density difference in the fuel gas and in the oxygen-containing gas is less likely to arise on the surface of the electrolyte electrode assembly. Therefore, an increase in the durability of the electrolyte electrode assembly can be expected.

(11) In the fuel cell stack described in one of (5) to (10), the total opening sectional area of the fuel gas outlets may be smaller than the total opening sectional area of the oxygen-containing gas outlets.

(12) In the fuel cell stack described in one of (5) to (11), the number of the fuel gas supply inlets may be smaller than the number of the oxygen-containing gas supply inlets.

(13) In the fuel cell stack described in one of (1) to (12), the volume of the fuel gas channel may be smaller than the volume of the oxygen-containing gas channel.

According to these configurations, in a fuel cell usually operating at A/F>1, the pressure difference and pressure loss difference between the fuel gas and the oxygen-containing gas decreases. Consequently, oxygen-containing gas and other gases such as exhaust gas from outside the electrolyte electrode assembly can be further prevented from entering the anode, and fuel gas and other gases such as exhaust gas from outside the electrolyte electrode assembly can be further prevented from entering the cathode. This easily increases the durability of the separator and the electrolyte electrode assembly.

(14) In the fuel cell stack described in one of (1) to (13), the sandwiching section may include a plurality of first projections that touch the anode.

(15) In the fuel cell stack described in one of (1) to (14), the sandwiching section may include a plurality of second projections that touch the cathode.

According to these configurations, the plurality of projections achieve good power collection; in addition, the circulation of the fuel gas and the fuel exhaust gas along the fuel gas channel formed between the projections can be enhanced. Also, the circulation of the oxygen-containing gas and oxygen-containing exhaust gas along the oxygen-containing gas channel between the projections can also be enhanced.

(16) In the fuel cell stack described in one of (1) to (13), the sandwiching section may include a plurality of first projections that touch the anode, and a plurality of second projections that touch the cathode, the first projections and the second projections being arranged such that when viewed from the stacking direction, the number of the first projections and the second projections which overlap each other is greater than the number of them which do not overlap each other.

According to this configuration, a load in the stacking direction can be reliably transmitted between the first projections (anode side projections) and the second projections (cathode side projections), increasing the adhesion between the electrolyte electrode assembly and the separator, and enabling the power generated by the electrolyte electrode assembly to be collected efficiently.

(17) In the fuel cell stack described in one of (1) to (16), the bridge may include: a fuel gas bridge that is connected to the sandwiching section and includes a fuel gas supply channel which supplies the fuel gas to the fuel gas channel; and an oxygen-containing gas bridge that is connected to the sandwiching section and includes an oxygen-containing gas supply channel which supplies the oxygen-containing gas to the oxygen-containing gas channel, the reactant gas supply section may include: a fuel gas supply section that is connected to the fuel gas bridge and includes a fuel gas supply passage which supplies the fuel gas to the fuel gas supply channel, the fuel gas supply passage being formed in the stacking direction; and an oxygen-containing gas supply section that is connected to the oxygen-containing gas bridge and includes an oxygen-containing gas supply passage which supplies the oxygen-containing gas to the oxygen-containing gas supply channel, the oxygen-containing gas supply passage being formed in the stacking direction, the fuel gas bridge and the oxygen-containing gas bridge may be arranged in a point-symmetrical formation with respect to a central point of the sandwiching section, and the fuel gas supply section and the oxygen-containing gas supply section may be arranged in a point-symmetrical formation with respect to the central point of the sandwiching section.

According to this configuration, between the fuel gas supply section and the sandwiching section, the tightening load in the stacking direction is shut off via the fuel gas bridge. Furthermore, between the oxygen-containing gas supply section and the sandwiching section, the tightening load in the stacking direction is shut off via the oxygen-containing gas bridge. Consequently, a desired load can be applied to the electrolyte electrode assembly. Thus, using a simple and compact configuration, it is possible to apply a comparatively large load to portions that demand sealability (the fuel gas supply section and the oxygen-containing gas supply section), and apply a comparatively small load, being sufficient to increase adhesion with the sandwiching section, to the electrolyte electrode assembly. Consequently, a desired sealability can be ensured in the fuel gas supply section and the oxygen-containing gas supply section; in addition, damage to the electrolyte electrode assembly can be prevented as much as possible, achieving efficient generation and collection of power.

Also, the fuel gas bridge and the oxygen-containing gas bridge are arranged in a point-symmetrical formation with respect to the central point of the sandwiching section, the fuel gas supply section and the oxygen-containing gas supply section being arranged in a point-symmetrical formation with respect to the central point of the sandwiching section, whereby stress in the in-plane directions of the bridges (fuel gas bridge and oxygen-containing gas bridge) is easily converted to rotational force in the circumferential directions of the separator with the sandwiching section at the center. Therefore, it becomes possible to suppress distortion of the separator resulting from expansion and contraction due to heat, which is of particular concern in the solid oxide fuel cell. Adhesion between the separator and the electrolyte electrode assembly can thereby be maintained, and power can be generated and collected efficiently. Moreover, since the separator exerts no unbalanced load on the electrolyte electrode assembly, the durability of the electrolyte electrode assembly can be increased, and damage to it can be prevented. Furthermore, since deformation of the reactant gas bridges can be prevented, a desired quantity of reactant gas can be supplied to the electrolyte electrode assembly at all times. Thus, the power generation efficiency is stabilized.

(18) In the fuel cell stack described in (17), the total opening sectional area of the fuel gas supply channel may be smaller than the total opening sectional area of the oxygen-containing gas supply channel.

(19) In the fuel cell stack described in (17) or (18), the total opening sectional area of the fuel gas supply passage may be smaller than the total opening sectional area of the oxygen-containing gas supply passage.

According to these configurations, in a fuel cell operating at a reactant gas air-fuel ratio of (A/F)>1, the pressure difference and pressure loss difference between the fuel gas and the oxygen-containing gas decreases. As a result, oxygen-containing gas and other gases such as exhaust gas from outside the electrolyte electrode assembly can be further prevented from entering the anode, and fuel gas and other gases such as exhaust gas from outside the electrolyte electrode assembly can be further prevented from entering the cathode. This easily increases the durability of the separator and the electrolyte electrode assembly.

(20) In the fuel cell stack described in one of (17) to (19), the fuel gas supply section may be provided at a center of the separator; and a plurality of the electrolyte electrode assemblies may be arranged concentrically around the fuel gas supply section.

According to this configuration, since the fuel gas supply section is provided at the center of the separator, the fuel gas supplied to the fuel cell can be well heated using heat generated by power-generation. This increases the thermal efficiency, and makes the fuel cell better able to achieve thermal self-sustenance. Here, thermal self-sustenance denotes a state where the fuel cell maintains its operating temperature using only heat generated by itself, without heat being applied from the outside.

In addition, since the plurality of electrolyte electrode assemblies are arranged concentrically around the fuel gas supply section, the fuel gas can be distributed uniformly from the fuel gas supply section to the electrolyte electrode assemblies, and their power generation performance can be enhanced and stabilized.

(21) In the fuel cell stack described in (20), the electrolyte electrode assemblies may be arranged in substantially same phase when viewed from the stacking direction.

According to this configuration, since the load applied to the electrolyte electrode assemblies is never insufficient, the adhesion between the electrolyte electrode assemblies and the separator is increased, and the power generated by the electrolyte electrode assemblies can be collected efficiently.

(22) In the fuel cell stack described in (20) or (21), the sandwiching sections may have shapes corresponding to the electrolyte electrode assemblies; and the sandwiching sections may be arranged separately from each other.

According to this configuration, since the sandwiching sections have shapes corresponding to the electrolyte electrode assemblies, they can efficiently collect the power generated by the electrolyte electrode assemblies.

Moreover, since the sandwiching sections are arranged separately from each other, loads in the stacking direction can be applied independently to adjacent electrolyte electrode assemblies. This makes it possible to absorb different loads generated in the electrolyte electrode assemblies due to error in dimension of the electrolyte electrode assemblies and the separator. Therefore, distortion can be prevented throughout the entire separator, and loads can be uniformly applied to the electrolyte electrode assemblies. In addition, since thermal distortion and the like of the electrolyte electrode assemblies is not transmitted to other adjacent electrolyte electrode assemblies, there is no need to provide a special dimension-absorbing mechanism between the electrolyte electrode assemblies. Therefore, the electrolyte electrode assemblies can be arranged near each other, and the entire fuel cell can easily be made smaller.

(23) In the fuel cell stack described in one of (20) to (22), the fuel gas bridges may be spaced apart at an equiangular interval and arranged radially outward from the fuel gas supply section.

According to this configuration, the fuel gas can be supplied uniformly from the fuel gas supply section and via the reactant gas bridges to the electrolyte electrode assemblies, increasing the power generation performance and stability of the electrolyte electrode assemblies.

(24) In the fuel cell stack described in one of (17) to (23), in the separator, each number of the sandwiching section, the fuel gas bridge, and the oxygen-containing gas bridge may correspond to the number of the electrolyte electrode assemblies.

According to this configuration, the fuel gas can be supplied uniformly from the fuel gas supply section and via the reactant gas bridges to the electrolyte electrode assemblies, increasing the power generation performance and stability of the electrolyte electrode assemblies.

(25) In the fuel cell stack described in one of (1) to (16), the bridge may be connected to the sandwiching section, and may include a fuel gas supply channel that supplies the fuel gas to the fuel gas channel and an oxygen-containing gas supply channel that supplies the oxygen-containing gas to the oxygen-containing gas channel; and the reactant gas supply section may be connected to the bridge, and may include a fuel gas supply passage that supplies the fuel gas to the fuel gas supply channel and an oxygen-containing gas supply passage that supplies the oxygen-containing gas to the oxygen-containing gas supply channel, the fuel gas supply passage and the oxygen-containing gas supply passage being arranged along the stacking direction.

According to this configuration, since the tightening load is shut off via the bridges between the reactant gas supply section and the sandwiching sections, a desired load can be applied to the electrolyte electrode assemblies.

It therefore becomes possible, using a simple and compact configuration, to apply a comparatively large load to portions that demand sealability, and to apply a comparatively small load, being sufficient to increase adhesion with the sandwiching sections, to the electrolyte electrode assemblies. Consequently, a desired sealability can be ensured in the reactant gas supply sections; in addition, damage to the electrolyte electrode assembly can be prevented as much as possible, achieving efficient generation and collection of power.

Moreover, the fuel gas supply channel and the oxygen-containing gas supply channel are formed in the reactant gas bridge. Therefore, the temperature difference between the fuel gas and the oxygen-containing gas is reduced before they are supplied to the electrolyte electrode assembly, enabling the electrolyte electrode assembly to generate power stably.

Also, the fuel gas supply passage and the oxygen-containing gas supply passage are formed in the reactant gas supply section. Therefore, the temperature difference between the fuel gas and the oxygen-containing gas is reduced before they are supplied to the electrolyte electrode assembly, enabling the electrolyte electrode assembly to generate power stably.

In addition, the fuel gas supply passage and the oxygen-containing gas supply passage, which both demand sealability, are integrated with the reactant gas supply section. Therefore, a desired sealability can be achieved in the reactant gas supply section, damage to the electrolyte electrode assembly can be prevented as much as possible, and power can be generated and collected efficiently.

(26) In the fuel cell stack described in (25), the total opening sectional area of the fuel gas supply channel may be smaller than the total opening sectional area of the oxygen-containing gas supply channel.

(27) In the fuel cell stack described in (25) or (26), the total opening sectional area of the fuel gas supply passage may be smaller than the total opening sectional area of the oxygen-containing gas supply passage.

According to these configurations, in a fuel cell operating at a reactant gas air-fuel ratio (A/F)>1, the pressure difference and pressure loss difference between the fuel gas and the oxygen-containing gas decreases. As a result, oxygen-containing gas and other gases such as exhaust gas from outside the electrolyte electrode assembly can be further prevented from entering the anode, and fuel gas and other gases such as exhaust gas from outside the electrolyte electrode assembly can be further prevented from entering the cathode. This can easily increase the durability of the separator and the electrolyte electrode assembly.

(28) In the fuel cell stack described in one of (1) to (4), the bridge may include a fuel gas bridge that is connected to the sandwiching section and includes a fuel gas supply channel that supplies the fuel gas to the fuel gas channel; the reactant gas supply section may include a fuel gas supply section that is connected to the fuel gas bridge and includes a fuel gas supply passage that supplies the fuel gas to the fuel gas supply channel in the stacking direction; a plurality of the electrolyte electrode assemblies may be arranged concentrically around the fuel gas supply section, the number of the sandwiching sections and the fuel gas bridges corresponding to the number of the electrolyte electrode assemblies; a rectifying member that guides the oxygen-containing gas into the oxygen-containing gas channel may be provided between adjacent sandwiching sections; the rectifying member may include a sealing part that seals adjacent sandwiching sections in the surface of the separator; and a space enclosed by the sealing part and a circumferential edge of the separator may constitute an oxygen-containing gas supply section that makes the oxygen-containing gas flow in the stacking direction, and supplies the oxygen-containing gas to the oxygen-containing gas channel.

According to this configuration, since the space enclosed by the circumferential edge of the separators and the sealing part of the rectifying member constitutes the oxygen-containing gas supply section, there is no need to provide the separators with the oxygen-containing gas supply section. Consequently, the configuration can be simplified and the manufacturing cost can be reduced. Since the area between adjacent sandwiching sections is sealed by the sealing part, the oxygen-containing gas flowing along the oxygen-containing gas supply passage does not leak from between the adjacent sandwiching sections, and is reliably introduced into the oxygen-containing gas channel. Therefore, the oxygen-containing gas can be supplied without deficiency.

(29) In the fuel cell stack described in one of (17) to (28), the fuel gas supply section and the reactant gas supply section may be arranged in a center of the separator; and four of the electrolyte electrode assemblies may be arranged concentrically around the fuel gas supply section and the reactant gas supply section.

According to this configuration, since the fuel gas supply section and the reactant gas supply section are arranged in the center of the separator, the fuel gas supplied to the fuel cell can be well heated using heat generated by power-generation, thereby increasing the thermal efficiency and making the fuel cell better able to achieve thermal self-sustenance. Here, thermal self-sustenance denotes a state where the fuel cell maintains its operating temperature using only heat generated by itself, without heat being applied from the outside.

Moreover, the four electrolyte electrode assemblies are arranged concentrically within the plane of the separator. Therefore, in a fuel cell structure wherein two or more electrolyte electrode assemblies having substantially same shape and substantially same area are arranged concentrically within the plane of the separators, high occupancy can be obtained. In addition, the stack volume per power generation output is reduced, and the overall fuel cell stack is easily made compact. Also, the stack surface area per power generation output can be reduced and heat radiation from the fuel cell stack can be minimized, increasing the thermal efficiency and facilitating thermal self-sustenance.

(30) The fuel cell stack described in one of (1) to (29) may further include a load-applying mechanism that applies a load in the stacking direction to each of the fuel cells, the load-applying mechanism being set so as to apply a load in the stacking direction applied near the reactant gas supply section that is greater than a load applied to the electrolyte electrode assembly.

According to this configuration, by applying a comparatively large load to near the reactant gas supply section, good sealability of the reactant gas supply section can be maintained. Also, by applying a comparatively small load to the electrolyte electrode assembly, damage to the electrolyte electrode assembly can be prevented, the adhesion between the electrolyte electrode assembly and the sandwiching section can be ensured, and the power collection efficiency can be increased.

(31) In the fuel cell stack described in (30), the load-applying mechanism may include: a first load-applying mechanism that applies a load in the stacking direction to the electrolyte electrode assembly; and a second load-applying mechanism that applies a load in the stacking direction to near the reactant gas supply section, and the load applied from the second load-applying mechanism to near the reactant gas supply section may be greater than the load applied from the load-applying mechanism to the electrolyte electrode assembly.

According to this configuration, by using the first load-applying mechanism and the second load-applying mechanism to apply loads to the electrolyte electrode assembly and near to the reactant gas supply section respectively, the loads applied to near the reactant gas supply section and the electrolyte electrode assembly can be made mutually different. Specifically, if the load applied from the second load-applying mechanism is larger than the load applied from the first load-applying mechanism, it becomes possible to apply a comparatively large load to the part that demands sealability (the reactant gas supply section), and to apply a comparatively small load, being sufficient to increased the adhesion with the sandwiching section, to the electrolyte electrode assembly.

(32) In the fuel cell stack described in (30) or (31), the load-applying mechanism may absorb stress that is generated at a surface of the bridge of the separator, as rotational force in the circumferential direction of the separator in the sandwiching section.

According to this configuration, since the load-applying mechanism absorbs the stress acting on the sandwiching section from the bridge, warping of the separator resulting from expansion and contraction due to heat can be suppressed, adhesion between the separator and the electrolyte electrode assembly can be maintained, and power can be generated and collected efficiently. Moreover, since no unbalanced load from the separator acts on the electrolyte electrode assembly, the durability of the electrolyte electrode assembly can be increased, and damage to it can be prevented. Furthermore, since deformation of the reactant gas bridge can be prevented, a desired quantity of reactant gas can be supplied to the electrolyte electrode assembly at all times, thereby stabilizing the power generation efficiency.

(33) In the fuel cell stack described in (32), the load-applying mechanism may include a supporting member that rotationally supports the sandwiching section in the surface of the separator.

According to this configuration, since the sandwiching section is rotatably supported by the supporting member, when a rotational force acts from the reactant gas bridge toward the sandwiching section in the manner described above, the sandwiching section can be rotated freely in accordance with this rotational force. This enables the rotational force acting on the sandwiching section from the bridge to be absorbed easily.

(34) In the fuel cell stack described in one of (1) to (33), the fuel cell may be a solid oxide fuel cell.

According to this configuration, thermal distortion and the like of the sandwiching sections and the electrolyte electrode assemblies due to stress, which is of particular concern in a solid oxide fuel cell that is a high-temperature fuel cell, is not transmitted to other adjacent electrolyte electrode assemblies and sandwiching sections. Therefore, it is not necessary to provide a special dimension-absorbing mechanism between the electrolyte electrode assemblies and the sandwiching sections, and the entire fuel cell can easily be made smaller.

Advantageous Effects

According to the present invention, between the reactant gas supply section and the sandwiching section, the tightening load in the stacking direction is shut off via the bridge. Consequently, a desired load can be applied to the electrolyte electrode assembly. This makes it possible, using a simple and compact configuration, to apply a comparatively large load to a portion that demands sealability (the reactant gas supply section), and apply a comparatively small load, being sufficient to increase adhesion with the sandwiching section, to the electrolyte electrode assembly Therefore, the desired sealability is achieved; in addition, damage to the electrolyte electrode assembly can be prevented as much as possible, achieving efficient generation and collection of power.

Since the connecting section between the sandwiching section and the bridge is connected such that the tangential direction of the circumferential edge of the sandwiching section is substantially same as the tangential direction of the circumferential edge of the bridge, stress (warping force) in the in-plane directions of the bridge acts in the tangential direction of the sandwiching section and is converted to a rotational force in the circumferential directions of the sandwiching section. That is, since the sandwiching section rotates slightly, it can absorb the stress acting on the bridge, and can suppress concentration of stress in the connecting section.

Therefore, since warping of the separator resulting from expansion and contraction due to heat can be suppressed, adhesion between the separator and the electrolyte electrode assembly can be maintained, and power can be generated and collected efficiently. Moreover, since no unbalanced load from the separator acts on the electrolyte electrode assembly, the durability of the electrolyte electrode assembly can be increased, and damage to it can be prevented. Furthermore, since deformation of the reactant gas bridge can be prevented, a desired quantity of reactant gas can be supplied to the electrolyte electrode assembly at all times, thereby stabilizing the power generation efficiency.

BRIEF DESCRIPTION OF DRAWINGS

FIG. 1 is an explanatory schematic perspective view of a fuel cell stack according to a first embodiment.
FIG. 2 is a cross-sectional view taken along line A-A in FIG. 1.
FIG. 3A is a plan view of a fuel cell according to a first embodiment.
FIG. 3B is a side cross-sectional view of the same fuel cell.
FIG. 3C is a bottom view of the same fuel cell.
FIG. 4 is an exploded perspective view of a fuel cell according to a first embodiment.
FIG. 5 is a plan view of a separator according to a first embodiment.
FIG. 6 is an explanatory schematic perspective view of a fuel cell stack according to a second embodiment.

FIG. 7 is a cross-sectional view taken along line C-C in FIG. 6.
FIG. 8 is an exploded perspective view of a fuel cell according to a second embodiment.
FIG. 9 is a plan view of a separator according to a second embodiment.
FIG. 10 is a cross-sectional view of a fuel cell stack according to a third embodiment.
FIG. 11 is an exploded perspective view of a fuel cell according to a third embodiment.
FIG. 12 is a plan view of a separator according to a third embodiment.
FIG. 13 is a cross-sectional view of a fuel cell stack according to a fourth embodiment.
FIG. 14 is an exploded perspective view of a fuel cell according to a fourth embodiment.
FIG. 15 is a plan view of a separator according to a fourth embodiment.

EMBODIMENT OF THE INVENTION

Figure 3A:
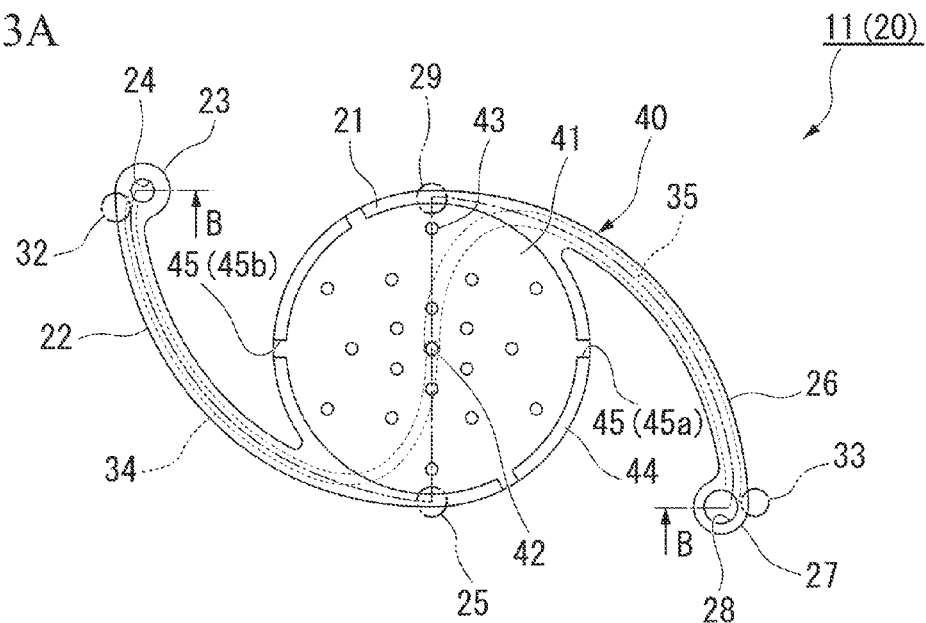
[FIG. 3A]

Embodiments of the invention will be explained with reference to the drawings. The fuel cell stack explained below can be used for various purposes in addition to standard installation, such as installation on a vehicle.
(First Embodiment)
FIGS. 3A to 3C are explanatory views of a fuel cell 11 according to a first embodiment, FIG. 3A showing a plan view, FIG. 3B, a side cross-sectional view taken along the line B-B of FIG. 3A, and FIG. 3C, a bottom view.

Figure 3B:
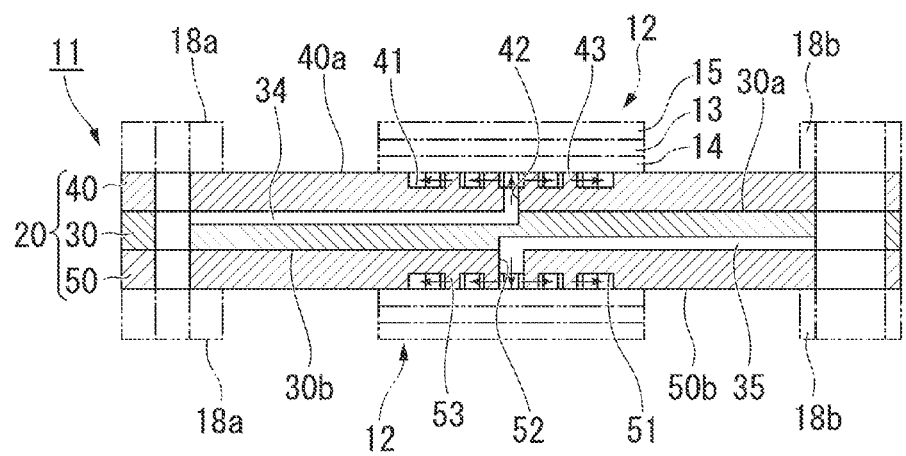
[FIG. 3B]
Figure 3C:
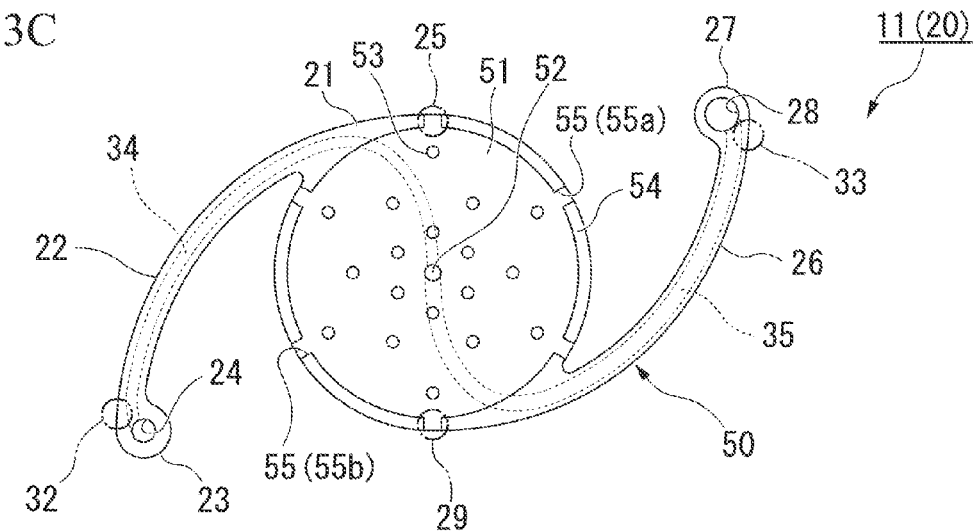
[FIG. 3C]

As shown in FIG. 3B, the fuel cell 11 includes electrolyte electrode assemblies 12, and separators 20 arranged between adjacent electrolyte electrode assemblies 12. The electrolyte electrode assemblies 12 and the separators 20 are stacked alternately to form a fuel cell stack 10 (see FIG. 1). While an actual separator 20 has a thin plate-like shape, in FIG. 3A, the thickness of the separator 20 (and plates 30, 40, and 50 that form the separator 20) is enlarged to facilitate understanding of the structure, such as a gas flow path that is formed in the separator 20.

Each electrolyte electrode assembly 12 is formed in a circular shape by arranging an anode 14 and a cathode 15 on both sides of an electrolyte (electrolyte plate) 13 formed using an oxide-ion conductor such as, for example, stabilized zirconia. A barrier layer (not shown) is provided on side faces of the electrolyte electrode assembly 12 to prevent infiltration and leakage of oxygen-containing gas and fuel gas.
(Separator)
As shown in FIG. 3A, each separator 20 includes a sandwiching section 21 having substantially same large-diameter circular shape as the electrolyte electrode assemblies 12. The electrolyte electrode assemblies 12 are sandwiched by sandwiching sections 21 of adjacent separators 20. A pair of reactant gas bridges (fuel gas bridge 22 and oxygen-containing gas bridge 26) are formed in a circular arc shape, and extend from the sandwiching section 21. Small-diameter circular arc-shaped reactant gas supply sections (fuel gas supply section 23 and oxygen-containing gas supply section 27) are provided at tips of the reactant gas bridges 22 and 26 respectively. Reactant gas supply passages (fuel gas supply passage 24 and oxygen-containing gas supply passage 28) are formed in the centers of the reactant gas supply sections 23 and 27. The reactant gas supply passages 24 and 28 are formed in the stacking direction of the fuel cell 11. The specific configurations of the reactant gas bridges 22 and 26 will be explained later.

As shown in FIG. 3B, seal members (gaskets) 18a and 18b are provided between the reactant gas supply sections 23 and 27 of adjacent separators 20. The seal members 18a and 18b are made from an insulating material that is strong in a reducing atmosphere of fuel gas (e.g. a crustal component material, a vitreous material, a compound material of clay and plastic, etc.). The heights of the seal members 18a and 18b are roughly the same as the height of the electrolyte electrode assembly 12.

Figure 4:
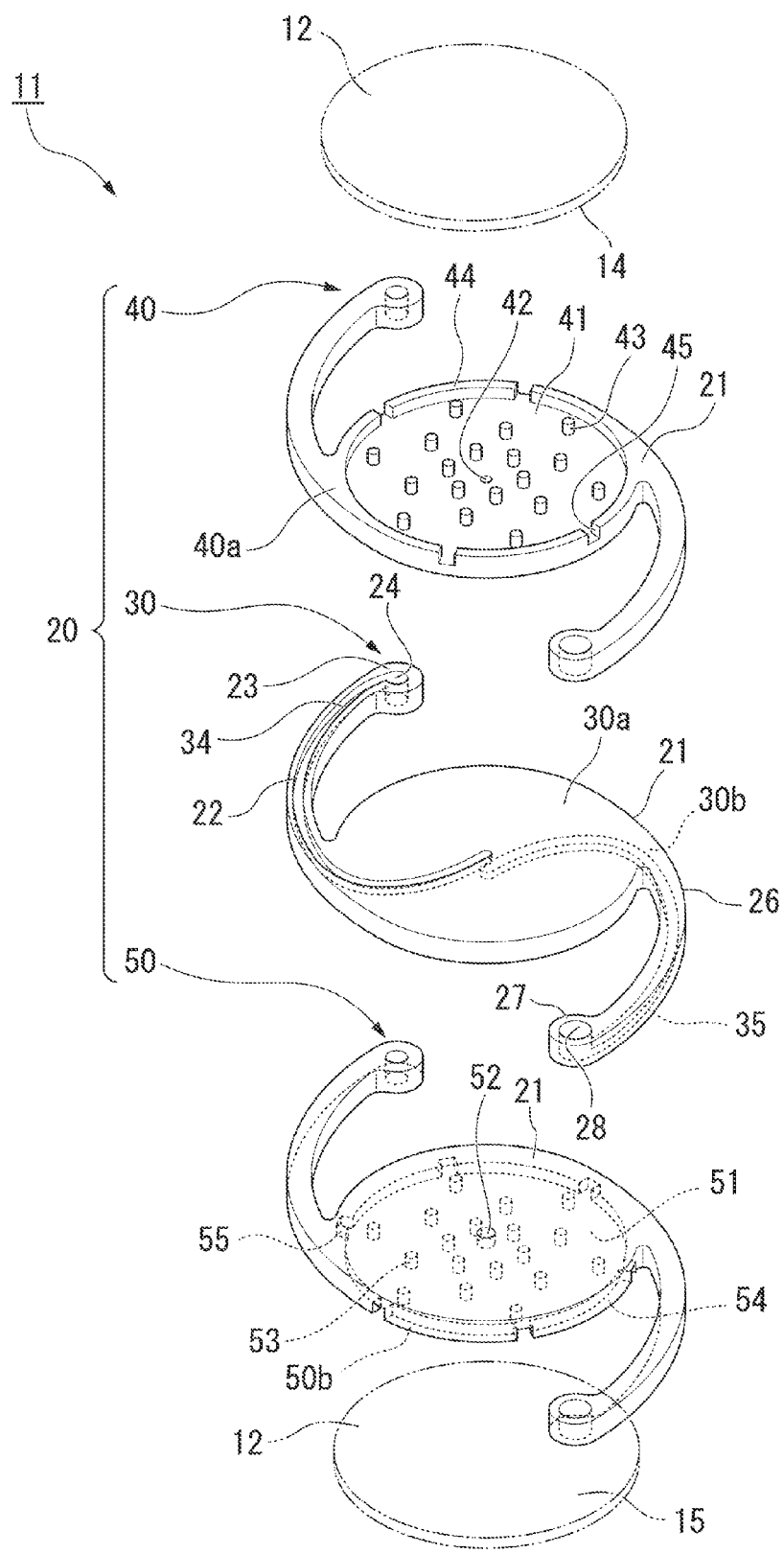
[FIG. 4]

FIG. 4 is an exploded perspective view of the fuel cell 11 according to the first embodiment.

As shown in FIG. 4, the separator 20 of the fuel cell 11 is formed by stacking a first plate 40, a second plate 50, and a third plate 30. Specifically, the separator 20 is configured such that the first plate 40 is arranged on the top face 30a of the third plate 30, the second plate 50 is arranged on the rear face 30b of the third plate 30, and the third plate 30 is sandwiched between the first plate 40 and the second plate 50. The plates 30, 40, and 50 are made from, for example, plates of stainless alloy, and are bonded together by brazing, diffusion bonding, laser welding, etc. Each of the plates 30, 40, and 50 includes, in addition to the sandwiching section 21 for forming the separator 20, a fuel gas bridge 22, a fuel gas supply section 23, a fuel gas supply passage 24, an oxygen-containing gas bridge 26, an oxygen-containing gas supply section 27, and an oxygen-containing gas supply passage 28.
(Fuel Gas Channel)
As shown in FIGS. 3A and 3B, a fuel gas channel 41 is formed on the top face 40a of the first plate 40 near the electrolyte electrode assembly 12. Specifically, the fuel gas channel 41 is formed by using a method such as half-etching to make a cutout in the center of the sandwiching section 21. A fuel gas supply inlet 42 is provided near the center of the fuel gas channel 41, and communicates with a subsequently described fuel gas supply channel 34 of the third plate 30.

A plurality of first projections 43 are formed inside the fuel gas channel 41, and a first circumferential protrusion 44 is formed around the fuel gas channel 41. The first projections 43 and the first circumferential protrusion 44 can be formed by selectively forming the cutout that becomes the fuel gas channel 41. The first projections 43 and the first circumferential protrusion 44 touch the anode 14 of the electrolyte electrode assembly 12. The first projections 43 and the first circumferential protrusion 44 thus function as collectors of the power generated by the electrolyte electrode assembly 12. Since the sandwiching section 21 has substantially same shape as the electrolyte electrode assembly 12, with the first projections 43 and the first circumferential protrusion 44 being distributed over the entirety of the sandwiching section 21, the power generated by the electrolyte electrode assembly 12 can be collected efficiently.

A plurality of fuel gas outlets 45 are formed in the first circumferential protrusion 44 of the first plate 40. Specifically, the fuel gas outlets 45 are formed using a method such as half-etching to form grooves that communicates the inner side (fuel gas channel 41) of the first circumferential protrusion 44 with the outer side thereof. The fuel gas outlets 45 are spaced apart in a radial formation in the circumferential direction of the sandwiching section 21. One of the plurality of fuel gas outlets 45 (e.g. fuel gas outlet 45a) and one of the others (e.g. fuel gas outlet 45b) are arranged opposite each other in the diameter direction of the sandwiching section 21, in point-symmetrical formation with respect to the central point of the sandwiching section 21. This enables the fuel gas to be discharged uniformly from the entirety of the fuel gas channel 41.

(Oxygen-Containing Gas Channel)

As shown in FIGS. 3B and 3C, an oxygen-containing gas channel 51 is formed on a rear face 50b of the second plate 50 near the electrolyte electrode assembly 12. Specifically, the oxygen-containing gas channel 51 is formed by using a method such as half-etching to make a cutout in the center of the sandwiching section 21. An oxygen-containing gas supply inlet 52 is provided near the center of the oxygen-containing gas channel 51, and communicates with a subsequently explained oxygen-containing gas supply channel 35 of the third plate 30.

A plurality of second projections 53 are formed inside the oxygen-containing gas channel 51, and a second circumferential protrusion 54 is formed around the oxygen-containing gas channel 51. The second projections 53 and the second circumferential protrusion 54 can be formed by selectively forming the cutout that becomes the oxygen-containing gas channel 51.

The second projections 53 and the second circumferential protrusion 54 are in intimate contact with the cathode 15 of the electrolyte electrode assembly 12. The second projections 53 and the second circumferential protrusion 54 thus function as collectors of power generated by the electrolyte electrode assembly 12. Since the sandwiching section 21 has substantially same shape as the electrolyte electrode assembly 12, with the second projections 53 and the second circumferential protrusion 54 being distributed over the entirety of the sandwiching section 21, the power generated by the electrolyte electrode assembly 12 can be collected efficiently.

A plurality of oxygen-containing gas outlets 55 are formed in the second circumferential protrusion 54 of the second plate 50. Specifically, the oxygen-containing gas outlets 55 are formed by using a method such as half-etching to form a groove that communicates the inner side of the second circumferential protrusion 54 (oxygen-containing gas channel 51) with the outer side. The plurality of oxygen-containing gas outlets 55 are spaced apart at an equiangular interval and arranged radially in the circumferential direction of the sandwiching section 21. One of the plurality of oxygen-containing gas outlets 55 (e.g. oxygen-containing gas outlet 55a) and one of the others (e.g. oxygen-containing gas outlet 55b) are arranged opposite each other in the diameter direction of the sandwiching section 21, in point-symmetrical formation with respect to a central point of the sandwiching section 21. This enables the fuel gas to be discharged uniformly from the entirety of the oxygen-containing gas channel 51.

Figure 5:
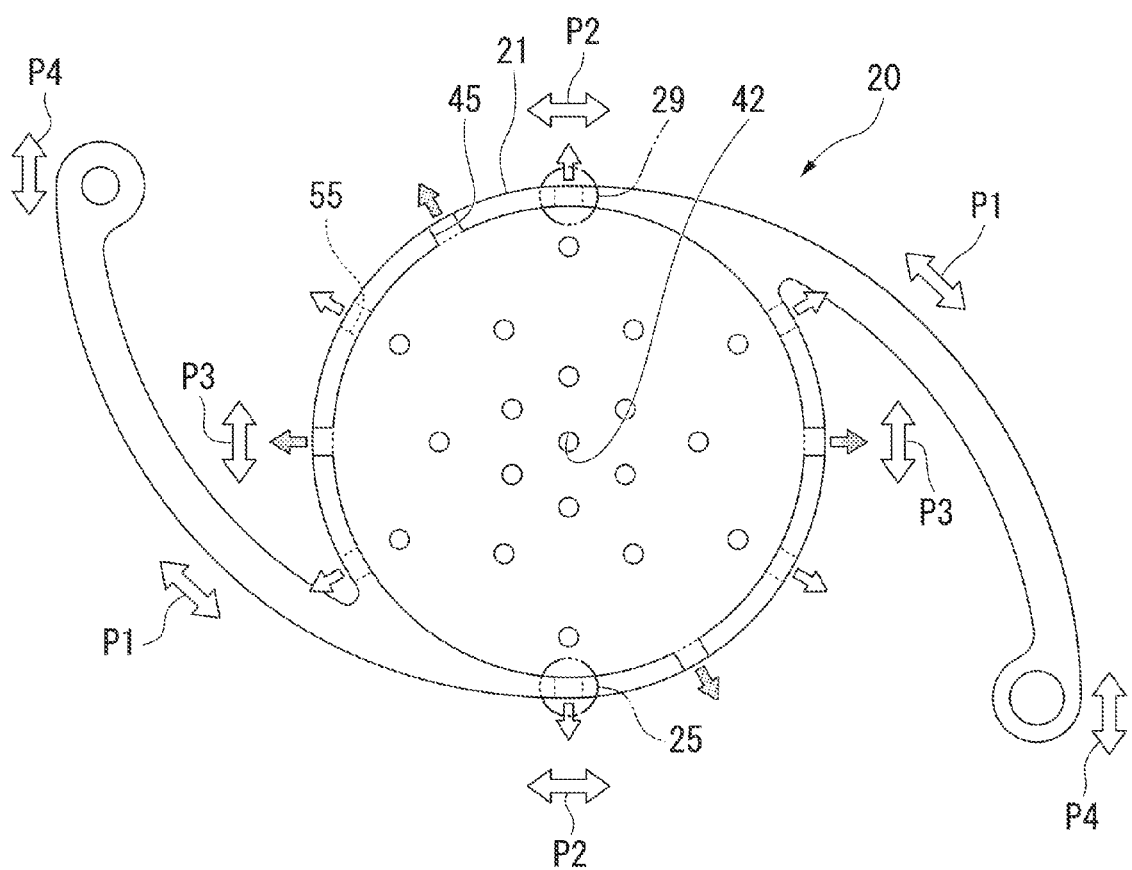
[FIG. 5]

FIG. 5 is a plan view of a separator 20.

As shown in FIG. 3A, FIG. 3C, and FIG. 5, the number of fuel gas outlets 45 (four in FIG. 5) is smaller than the number of oxygen-containing gas outlets 55 (six in FIG. 5). Also, the total opening sectional area of the fuel gas outlets 45 is smaller than the total opening sectional area of the oxygen-containing gas outlets 55.

The fuel gas outlets 45 and the oxygen-containing gas outlets 55 are arranged at different positions (such that their phases differ) in the circumferential direction of the sandwiching section 21. In FIG. 5, the fuel gas outlets 45 are arranged at intermediate positions (positions having an intermediate phase) between adjacent oxygen-containing gas outlets 55.

Here, as shown in FIGS. 3A to 5, the reactant gas bridges 22 and 26 are circular arc-shaped members having a radius that is larger than the radii of the sandwiching section 21 and the reactant gas supply sections 23 and 27, their bases connecting to the sandwiching section 21 and their tips connecting to the reactant gas supply sections 23 and 27. The reactant gas bridges 22 and 26 extend along the same direction (clockwise in FIG. 5) in the circumferential direction of the sandwiching section 21 such that they enclose the sandwiching section 21 from positions that differ by 180 degrees in the circumferential direction of the sandwiching section 21 (opposing positions with the sandwiching section 21 in between).

In the connecting sections 25 and 29 between the bases of the reactant gas bridges 22 and 26 and the circumferential edge of the sandwiching section 21, the tangential direction of the sandwiching section 21 is substantially same as the tangential direction of the reactant gas bridges 22 and 26. That is, the connecting sections 25 and 29 between the sandwiching section 21 and the reactant gas bridges 22 and 26 are formed as smoothly continuous planes, and do not protrude outside the diameter direction of the sandwiching section 21.

Similarly, in the connecting sections 32 and 33 that connect the tip sides of the reactant gas bridges 22 and 26 to the circumferential edges of the reactant gas supply sections 23 and 27, the tangential directions of the reactant gas supply sections 23 and 27 are substantially same as the tangential directions of the reactant gas bridges 22 and 26, respectively. That is, on the inner side of the outer-side circular arcs of the reactant gas bridges 22 and 26, the outer peripheral circle of the sandwiching section 21 touches the outer peripheral circles of the reactant gas supply sections 23 and 27. Furthermore, the reactant gas bridges 22 and 26 are arranged in point-symmetry with respect to the central point of the sandwiching section 21. Moreover, the reactant gas supply sections 23 and 27 are also arranged in point-symmetry with respect to the central point of the sandwiching section 21.

A fuel gas supply channel 34 is formed in the top face 30a of the third plate 30 facing the first plate 40. Specifically, the fuel gas supply channel 34 is formed by using a method such as half-etching or machining to form a groove that leads from the fuel gas supply passage 24 and through the fuel gas bridge 22 to near the center of the sandwiching section 21. Thus the fuel gas supply channel 34 is a smooth curve, and communicates with the fuel gas supply passage 24 such that its tangential direction is substantially same as the tangential direction of the fuel gas supply passage 24. The first plate 40 is bonded to the top face 30a of the third plate 30 to seal the upper opening of the fuel gas supply channel 34.

An oxygen-containing gas supply channel 35 is formed in the rear face 30b of the third plate 30 facing the second plate 50. Specifically, the fuel gas supply channel 35 is formed by using a method such as half-etching or machining to form a groove that leads from the oxygen-containing gas supply passage 28 and through the oxygen-containing gas bridge 26 to near the center of the sandwiching section 21. Thus the oxygen-containing gas supply channel 35 is a smooth curve, and communicates with the oxygen-containing gas supply passage 28 such that its tangential direction is substantially same as the tangential direction of the oxygen-containing gas supply passage 28. The second plate 50 is bonded to the rear face 30b of the third plate 30 to seal the upper opening of the oxygen-containing gas supply channel 35.

(Fuel Cell Stack)

Figure 1:
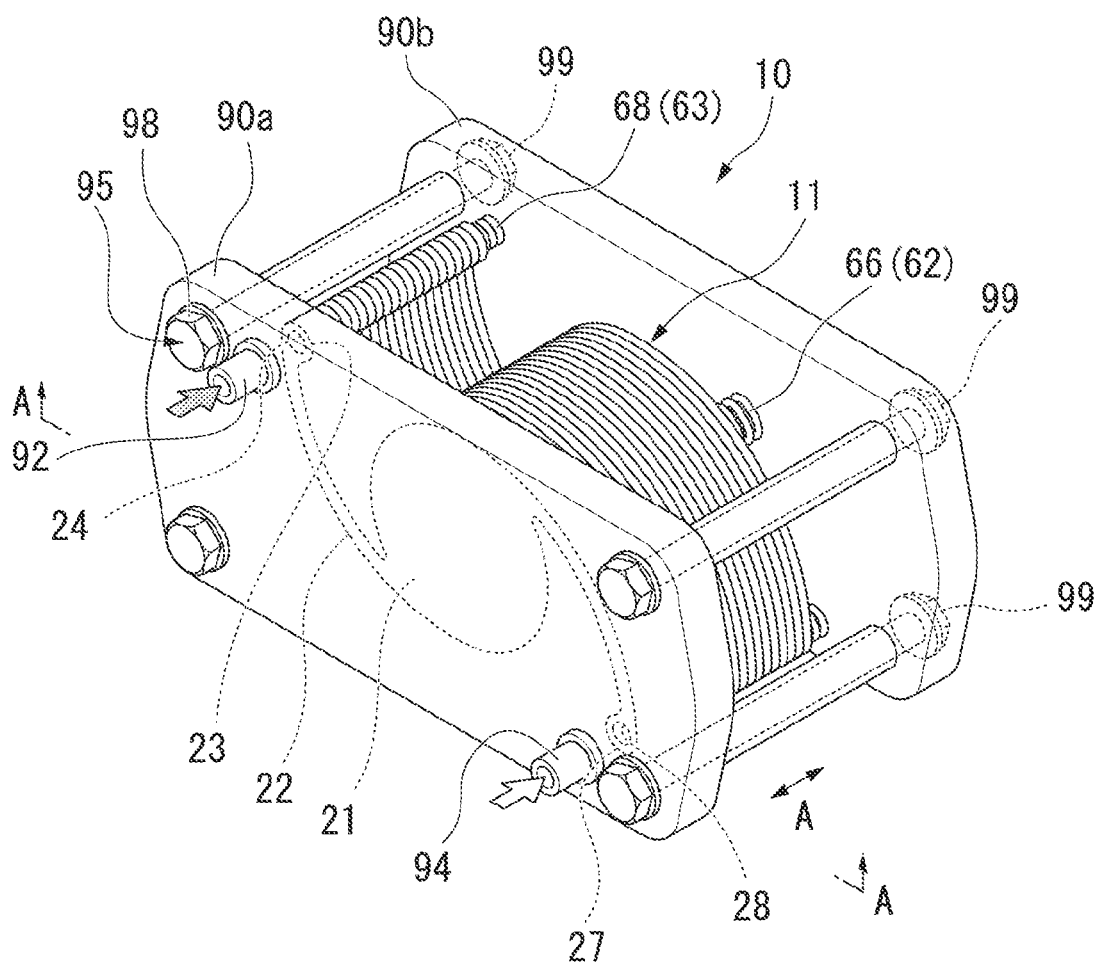
[FIG. 1]
Figure 2:
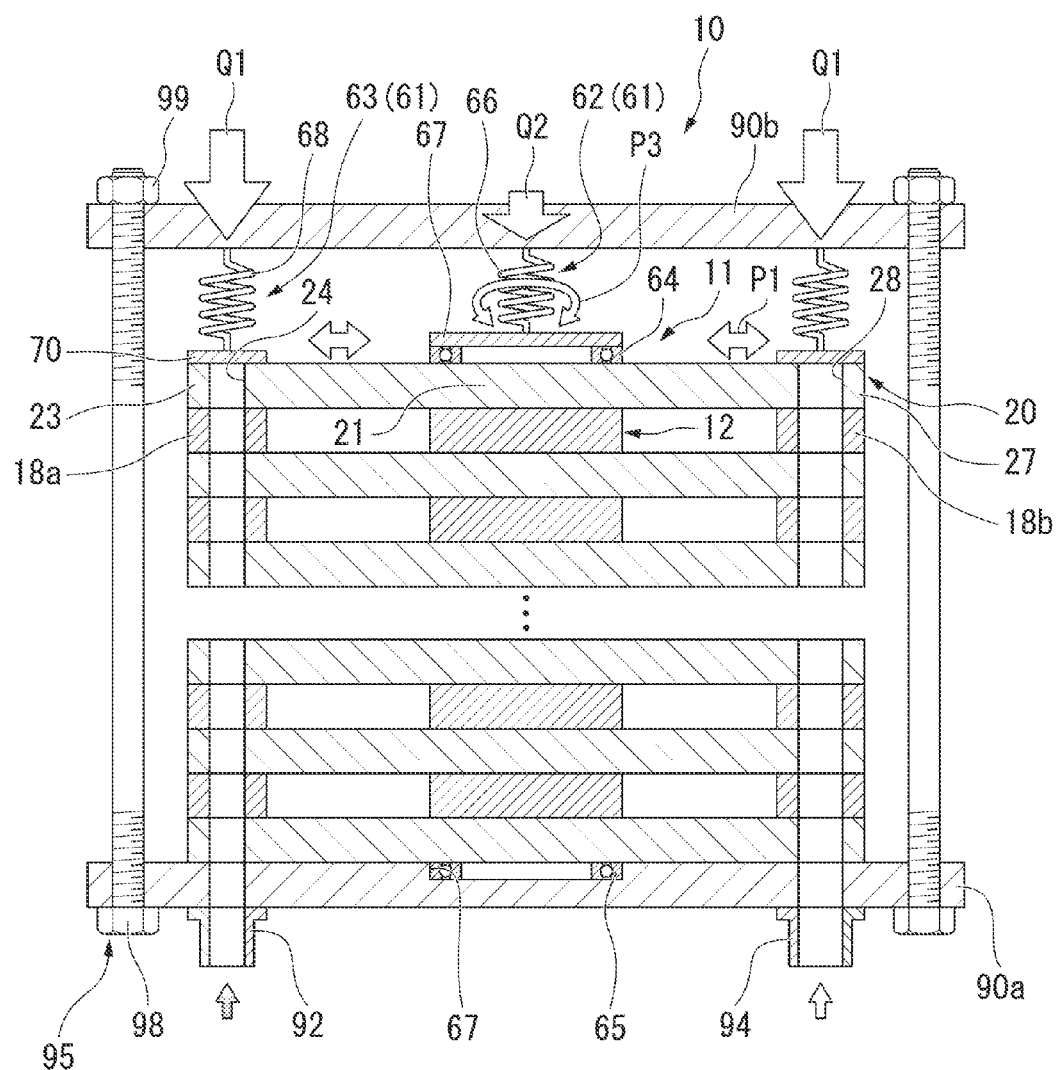
[FIG. 2]

FIG. 1 is a schematic perspective view of a fuel cell stack 10, and FIG. 2 is a cross-sectional view taken along line A-A in FIG. 1.

As shown in FIGS. 1 and 2, a plurality of the fuel cells 11 described above are stacked in the direction of arrow A to form the fuel cell stack 10. End plates 90a and 90b are provided at respective ends of the stacking direction of the fuel cell stack 10.

The end plate 90a includes a first pipe 92 that supplies fuel gas to the fuel gas supply passage 24 of the fuel cell stack 10, and a second pipe 94 that supplies oxygen-containing gas to the oxygen-containing gas supply passage 28 of the fuel cell stack 10. Exhaust gas from the fuel cell stack 10 is discharged radially from between the pair of end plates 90a and 90b.

In the stacking direction of the fuel cell stack 10, a load-applying mechanism 61 is provided between the end plates 90a and 90b and the fuel cell stack 10, and applies a load along the stacking direction of the fuel cell stack 10 (direction of arrow A). The load-applying mechanism 61 includes a first load-applying mechanism 62 that applies a load to the sandwiching section 21 and the electrolyte electrode assembly 12 of the fuel cell 11, and a second load-applying mechanism 63 that applies a load to the reactant gas supply sections 23 and 27.

The first load-applying mechanism 62 includes a pair of supporting members 64 and 65, which are arranged from the ends of the stacking direction of the fuel cell stack 10 with the sandwiching section 21 of the fuel cell 11 sandwiched between them, and a first load-applying mechanism 66, which is provided between the end plate 90b and the supporting member 64. As the supporting members 64 and 65, thrust ball bearings, ball bearings, thrust self-aligning roller bearing, and the like, are suitably used.

The supporting member 65 is press-fitted into a cutout 67 provided in the end plate 90a at a position where it overlaps with the surface of the sandwiching section 21. Both end faces of the supporting member 65 are flush with the end face of the end plate 90a, and the side face of the supporting member 64 contacts the side face of the sandwiching section 21. That is, the supporting member 64 rotationally supports the sandwiching section 21 along the circumferential direction.

The other supporting member 64 is arranged at the other end plate 90b at a position where it overlaps with the surface of the sandwiching section 21, with its side face contacting and rotationally supporting the sandwiching section 21.

The first load-applying mechanism 66 includes a coil spring made from a ceramic having electrical insulating and heat-resistant properties, and the like, and urges in the stacking direction of the fuel cell stack 10. One end of the first load-applying mechanism 66 connects to the end plate 90b, another end connects to a supporting plate 67, and the first load-applying mechanism 66 presses the other supporting member 64 toward the end plate 90a (supporting member 65) with this supporting plate 67 in between.

The second load-applying mechanism 63 includes a pair of second load-applying mechanism 68, provided between the other end plate 90b and the reactant gas supply sections 23 and 27 at the end of the stacking direction of the fuel cell stack 10. Like the first load-applying mechanism 66, the second load-applying mechanism 68 include coil springs made from ceramic and the like, and urge in the stacking direction of the fuel cell stack 10. Specifically, one end of each of the second load-applying mechanism 68 connects to the end plate 90b, and another end connects to a gasket 70 for sealing the reactant gas supply passages 24 and 28. The second load-applying mechanism 68 presses the reactant gas supply sections 23 and 28 towards the end plate 90a with the gasket 70 in between.

The pair of end plates 90a and 90b are connected by a fastening mechanism 95 including a bolt 98 and a nut 99. The bolt 98 is inserted from the outer side of the end plate 90a into a through hole in the pair of end plates 90a and 90b, and the nut 99 is screwed into the bolt 98 on the outer side of the end plate 90b. By this fastening mechanism 95, the fuel cell stack 10 is sandwiched between the pair of end plates 90a and 90b with the load-applying mechanism 61 in between, and a load in the stacking direction (hereinafter 'stacking load') is applied to the plurality of fuel cells 11.

Incidentally, in the fuel cell 11 of this embodiment, the reactant gas supply sections 23 and 27, and the sandwiching section 21, are connected by the narrow reactant gas bridges 22 and 26. The stacking loads applied to the reactant gas supply sections 23 and 27, and to the sandwiching section 21, can therefore be differentiated from each other. Moreover, in the fuel cell 11 of this embodiment, the stacking loads (arrows Q1 and Q2 in FIG. 2) from the load-applying mechanisms 62 and 63 acting on the reactant gas supply sections 23 and 27, and on the sandwiching section 21, are set such that they are different from each other. That is, a large stacking load for protecting the seal characteristics with the seal members 18a and 18b is applied to the reactant gas supply sections 23 and 27, whereas a comparatively small stacking load that increases the adhesion with the electrolyte electrode assembly is applied to the sandwiching section 21. Specifically, in the load-applying mechanisms 62 and 63, the spring constant of the first load-applying mechanism 66 is comparatively lower than the spring constant of the second load-applying mechanism 68. The spring constants are adjusted by, for example, varying the coil diameters of the load-applying mechanisms 66 and 68, or varying the wire diameters of the coils. By using the first load-applying mechanism 66 and the second load-applying mechanism 68 to urge the electrolyte electrode assembly 12 and the reactant gas supply sections 23 and 27 respectively in this manner, it is possible to apply appropriate stacking loads to the electrolyte electrode assembly 12 and the reactant gas supply sections 23 and 27. The stacking load can be adjusted by arranging the fastening mechanism 95 around the reactant gas supply sections 23 and 27 and the sandwiching section 21, while adjusting the fastening forces of the fastening mechanism 95.

(Effects)

Effects of the fuel cell having the configuration described above will be explained.

Firstly, the fuel cell stack 10 shown in FIG. 1 is heated to a predetermined temperature, a fuel gas (e.g. hydrogen gas) is supplied along the first pipe 92, and an oxygen-containing gas (e.g. air) is supplied along the second pipe 94.

Fuel gas supplied from the first pipe 92 shown in FIG. 1 flows along the fuel gas supply passage 24 shown in FIGS. 3A to 3C, and enters the fuel gas supply channel 34 of the plurality of stacked separators 20. After passing through the fuel gas supply channel 34 and being supplied near to the center of the sandwiching section 21, the fuel gas passes through the fuel gas supply inlet 42 and enters the fuel gas channel 41. Since the fuel gas channel 41 faces the anode 14 of the electrolyte electrode assembly 12, the fuel gas flows radially from near the center of the anode 14 toward its circumferential edge. Since the first circumferential protrusion 44 is in intimate contact with the circumferential edge of the anode 14, the fuel gas is prevented from being blown outside. Therefore, the fuel gas can be used effectively for power-generation reaction, increasing the fuel utilization efficiency.

Oxygen-containing gas (e.g. air) supplied from the second pipe 94 shown in FIG. 1 flows along the oxygen-containing gas supply passage 28 shown in FIGS. 3A to 3C, and enters the oxygen-containing gas supply channel 35 of the plurality of stacked separators 20. After passing through the oxygen-containing gas supply channel 35 and being supplied to near the center of the sandwiching section 21, the fuel gas passes through the oxygen-containing gas supply inlet 52 and enters the oxygen-containing gas channel 51. Since the oxygen-containing gas channel 51 faces the cathode 15 of the electrolyte electrode assembly 12, the oxygen-containing gas flows radially from near the center of the cathode 15 towards its circumferential edge. Since the second circumferential protrusion 54 is in intimate contact with the circumferential edge of the cathode 15, the oxygen-containing gas is prevented from being blown outside. Therefore, the oxygen-containing gas can be used effectively for power-generation reaction.

Oxide ions created from the oxygen-containing gas in the cathode 15 move through an electrolyte 13 to the anode 14, where they chemically react with the fuel gas, generating power. The fuel cell 11 can achieve thermal self-sustenance through continuation of the reaction. Thermal self-sustenance denotes a state where the fuel cell 11 maintains its operating temperature using only heat generated by itself, without heat being applied from the outside.

When generating power, the fuel cell described above rises to a temperature of approximately 600 degrees to 800 degrees. Due to this heat, the separators expand and contract, and stress is generated, for example, at the surface. With the conventional configuration described above, it might not be possible to tolerate this stress on the surface of the separators; in particular, if stress in the circumferential direction of the reactant gas bridges (the extending direction of the reactant gas bridges) concentrates in the connecting sections and the like between the sandwiching section and the reactant gas bridges, the reactant gas bridges will deform in the stacking direction of the fuel cell. Further, the separators will suffer thermal distortion and the like, and that they will deform in the stacking direction of the fuel cell.

Accordingly, in this embodiment, in the connecting sections 25 and 29 between the sandwiching section 21 and the reactant gas bridges 22 and 26, the tangential direction of the circumferential edge of the sandwiching section 21 is substantially same as the tangential direction of the circumferential edges of the reactant gas bridges 22 and 26.

According to this configuration, stress (arrows P1 in FIG. 5) that is generated along the lengths of the reactant gas bridges 22 and 26 when the fuel cell 11 generates power acts in the reverse direction (arrows P2 in FIG. 5) in the tangential direction of the sandwiching section 21 at the connecting sections 25 and 29.

In this case, the reactant gas bridges 22 and 26 extend from positions that differ by 180 degrees in the circumferential direction of the sandwiching section 21. Thus, stress from the reactant gas bridges 22 and 26 acting in the tangential direction of the sandwiching section 21 is converted to a rotational force (arrows P3 in FIG. 5) in the same direction (counterclockwise in FIG. 5), in the circumferential directions of the sandwiching section 21. Consequently, the sandwiching section 21 rotates slightly around its central point. This can alleviate the stress acting on the reactant gas bridges 22 and 26, and can suppress concentration of stress in the connecting sections 25 and 29.

Moreover, some of the stress generated in the extending directions of the reactant gas bridges 22 and 26 (arrows P1 in FIG. 5) also acts on the reactant gas supply sections 23 and 27. In this embodiment, since the tangential directions of the circumferential edges of the reactant gas bridges 22 and 26 are substantially same directions as the tangential directions of the circumferential edges of the reactant gas supply sections 23 and 27, the stress generated in the extending directions of the reactant gas bridges 22 and 26 acts in the tangential directions of the reactant gas supply sections 23 and 27, and is converted to a rotational force (arrows P4 in FIG. 5) in the circumferential directions of the reactant gas supply sections 23 and 27.

Consequently, the stress acting on the reactant gas bridges 22 and 26 can be absorbed, and concentration of stress in the connecting sections 32 and 33 and the like can be suppressed. Therefore, warping of the separators 20 resulting from expansion and contraction due to heat can be further suppressed.

Furthermore, since the radii of the reactant gas bridges 22 and 26 are larger than the radii of the sandwiching section 21 and the respective reactant gas supply sections 23 and 27, stress on the surface of the separators 20 generated in the reactant gas bridges 22 and 26 is transmitted to the tangential directions of the circular arcs of the reactant gas bridges 22 and 26, and is easily converted into rotational force in the circumferential directions of the separators 20 in the sandwiching section 21.

This embodiment also includes the supporting members 64 and 65, which are inserted so as to sandwich the fuel cell stack 10 from both ends of the stacking direction.

According to this configuration, since the sandwiching section 21 is rotatably supported by the supporting members 64 and 65, when a rotational force acts from the reactant gas bridges 22 and 26 toward the sandwiching section 21 in the manner described above, the sandwiching section 21 can be rotated freely in accordance with this rotational force. This enables the sandwiching section 21 to easily absorb the rotational force.

Therefore, this embodiment can suppress distortion of the separator 20 resulting from expansion and contraction due to heat, which is of particular concern in the solid oxide fuel cell 11. Adhesion between the separator 20 and the electrolyte electrode assembly 12 can thereby be maintained, and power can be generated and collected efficiently. Moreover, since the separator 20 exerts no unbalanced load on the electrolyte electrode assembly 12, the durability of the electrolyte electrode assembly 12 can be increased, and damage to it can be prevented. Furthermore, since deformation of the reactant gas bridges 22 and 26 can be prevented, a desired quantity of reactant gas can be supplied to the electrolyte electrode assembly 12 at all times, thereby stabilizing the power generation efficiency.

Moreover, the fuel gas bridge 22 and the oxygen-containing gas bridge 26 are arranged in point-symmetry with respect to the central point of the sandwiching section 21; in addition, the fuel gas supply section 23 and the oxygen-containing gas supply section 27 are arranged in point-symmetry with respect to the central point of the sandwiching section 21. Therefore, stress generated in the extending directions of the reactant gas bridges 22 and 26 is easily converted to a rotational force with the sandwiching section 21 at the center.

In the configuration of this embodiment, the fuel gas outlet 45a and one of the other fuel gas outlets 45 (e.g. fuel gas outlet 45b) are arranged in point-symmetry with respect to the central point of the sandwiching section 21; in addition, the oxygen-containing gas outlet 55a and one of the other oxygen-containing gas outlets 55 (e.g. oxygen-containing gas outlet 55b) are arranged in point-symmetry with respect to the central point of the sandwiching section 21. According to this configuration, the reactant gas (fuel gas, oxygen-containing gas) can, after use (including reacted and unreacted), be discharged without fluctuation and roughly uniformly from the circumferential edge of the sandwiching section 21. Therefore, since difference in temperature distribution in and around the sandwiching section 21 can be suppressed, expansion and contraction due to heat can be made roughly uniform without fluctuation, and stress from the separators 20 can be prevented from concentrating in one place.

In the fuel cell 11 of this embodiment, the fuel gas bridge 22 connects the sandwiching section 21 to the fuel gas supply section 23, and the oxygen-containing gas bridge 26 connects the sandwiching section 21 to the oxygen-containing gas supply section 27.

Thus, between the fuel gas supply section 23 and the sandwiching section 21, the tightening load in the stacking direction is shut off via the fuel gas bridge 22. Also, between the oxygen-containing gas supply section 27 and the sandwiching section 21, the tightening load in the stacking direction is shut off via the oxygen-containing gas bridge 26. Consequently, a desired load can be applied to the electrolyte electrode assembly 12.

Moreover, in this embodiment, the tightening load applied to the reactant gas supply sections 23 and 27 via the first load-applying mechanism 66 is greater than the tightening load applied to the electrolyte electrode assembly 12 (sandwiching section 21) via the second load-applying mechanism 68.

This makes it possible, using a simple and compact configuration, to apply a comparatively large load to portions that demand sealability (the fuel gas supply section 23 and the oxygen-containing gas supply section 27), and apply a comparatively small load, being sufficient to increase adhesion with the sandwiching section 21, to the electrolyte electrode assembly 12.

Consequently, a desired sealability can be ensured in the fuel gas supply section 23 and the oxygen-containing gas supply section 27; in addition, damage to the electrolyte electrode assembly 12 can be prevented as much as possible, achieving efficient generation and collection of power.

Since the sandwiching section 21 includes the first circumferential protrusion 44 and the second circumferential protrusion 54, adhesion between the separator 20 and the sandwiching section 21 is increased, and the stacking load can be transmitted reliably. Moreover, the first projections 43 that touch the anode 14 and the second projections 53 that touch the cathode 15 are formed at substantially same positions when viewed from the stacking direction of the separators 20. Therefore, the stacking load can be transmitted more reliably, the adhesion between the electrolyte electrode assembly 12 and the separator 20 can be increased, and power generated by the electrolyte electrode assembly 12 can be collected efficiently.

The oxygen-containing gas used in generating power is discharged to the outside of the cathode 15 from the oxygen-containing gas outlets 55 provided in the circumferential edge of the sandwiching section 21. If this oxygen-containing gas enters the anode 14, the anode 14 becomes oxidized, lowering the power generation efficiency and making the fuel cell 11 deteriorate.

To counter this, this embodiment includes the first circumferential protrusion 44, which prevents oxygen-containing gas and other gas such as exhaust gas from entering the anode 14 from outside the electrolyte electrode assembly 12. Consequently, a decrease in the power generation efficiency due to oxidization of the anode 14 is prevented, and the durability of the separator 20 and the electrolyte electrode assembly 12 is easily increased.

Fuel gas used in generating power is discharged to the outside of the anode 14 from the fuel gas outlets 45 provided in the circumferential edge of the sandwiching section 21. If this fuel gas enters the cathode 15, the cathode 15 becomes oxidized, lowering the power generation efficiency and making the fuel cell 11 deteriorate.

To counter this, this embodiment includes the second circumferential protrusion 54, which ensures that fuel gas and other gases such as exhaust gas from outside the electrolyte electrode assembly 12 do not enter the cathode 15. Consequently, a decrease in the power generation efficiency due to reduction of the cathode 15 is prevented, and the durability of the separator 20 and the electrolyte electrode assembly 12 is easily increased.

Furthermore, in this embodiment, since the fuel gas outlets 45 and the oxygen-containing gas outlets 55 are formed in different phases, in comparison with a configuration where the gas outlets 45 and 55 are arranged in substantially same phase, oxygen-containing gas and other gases such as exhaust gas from outside the electrolyte electrode assembly 12 can be further prevented from flowing into the fuel gas outlets 45 and entering the anode 14. Therefore, a decrease in the power generation efficiency due to oxidization of the anode 14 is prevented, and the durability of the separator 20 and the electrolyte electrode assembly 12 is easily increased.

Also, oxygen-containing gas and other gases such as exhaust gas from outside the electrolyte electrode assembly 12 can be further prevented from flowing into the oxygen-containing gas outlets 55 and entering the cathode 15. Therefore, a decrease in the power generation efficiency due to reduction of the cathode 15 is prevented, and the durability of the separator 20 and the electrolyte electrode assembly 12 is easily increased.

Moreover, since the discharged (unused) fuel gas and (unused) oxygen-containing gas burn around the sandwiching section 21, the fuel cell 11 (sandwiching section 21) can be heated beforehand, increasing the thermal efficiency and aiding thermal self-sustenance.

Fuel cells generally consume oxygen-containing gas and fuel gas at a fixed ratio (A/F>1.0). If the A/F is too small, fuel gas will be wasted, whereas if the A/F is too large, the temperature of the fuel cell will decrease.

In this embodiment, the channel cross-section of the fuel gas is smaller than the channel cross-section of the oxygen-containing gas. Specifically, the ratio between each of the channel cross-section of the oxygen-containing gas and the channel cross-section of the fuel gas roughly matches the A/F of the fuel cell 11. That is, each of the ratios between the cross-sections of the second pipe 94 and the first pipe 92, the oxygen-containing gas supply passage 28 and the fuel gas supply passage 24, the oxygen-containing gas supply channel 35 and the fuel gas supply channel 34, the oxygen-containing gas supply inlet 52 and the fuel gas supply inlet 42, the oxygen-containing gas channel 51 and the fuel gas channel 41, and the oxygen-containing gas outlets 55 and the fuel gas outlets 45, roughly matches the A/F of the fuel cell 11.

Consequently, the oxygen-containing gas and the fuel gas can be supplied without excess or deficiency, and it is possible to prevent fuel gas waste and a decrease in the temperature of the fuel cell 11. In a fuel cell 11 operating at A/F>1, the pressure difference and pressure loss difference between the fuel gas and the oxygen-containing gas decreases. As a result, oxygen-containing gas and other gases such as exhaust gas from outside the electrolyte electrode assembly 12 can be further prevented from entering the anode 14, and fuel gas and other gases such as exhaust gas from outside the electrolyte electrode assembly 12 can be further prevented from entering the cathode 15. This easily increases the durability of the separator 20 and the electrolyte electrode assembly 12.

In this embodiment, the total opening sectional area of the fuel gas outlets 45 is smaller than the total opening sectional area of the oxygen-containing gas outlets 55.

The number of the fuel gas outlets 45 is smaller than the number of the oxygen-containing gas outlets 55.

The total opening sectional area of the fuel gas supply inlets 42 is smaller than the total opening sectional area of the oxygen-containing gas supply inlets 52.

The number of the fuel gas supply inlets 42 is preferably smaller than the number of the oxygen-containing gas supply inlets 52.

The volume of the fuel gas channel 41 is preferably smaller than the volume of the oxygen-containing gas channel 51.

The total opening sectional area of the fuel gas supply channel 34 is smaller than the total opening sectional area of the oxygen-containing gas supply channel 35.

The total opening sectional area of the fuel gas supply passage 24 is smaller than the total opening sectional area of the oxygen-containing gas supply passage 28.

Consequently, in the fuel cell 11 that ordinarily operates at A/F>1.0, the pressure difference and pressure loss difference between the fuel gas and the oxygen-containing gas decreases. Oxygen-containing gas and other gases such as exhaust gas from outside the electrolyte electrode assembly 12 can thus be prevented from entering the anode 14, and fuel gas and other gases such as exhaust gas from outside the electrolyte electrode assembly 12 can be prevented from entering the cathode 15. This easily increases the durability of the separator 20 and the electrolyte electrode assembly 12.

The fuel gas outlets 45 are spaced apart in a radial formation from the center of the sandwiching section 21 on the surface of the separator 20.

The oxygen-containing gas outlets 55 are spaced apart at an equiangular interval and radially from the center of the sandwiching section 21 on the surface of the separator 20.

Therefore, the fuel gas spreads through the entirety of the anode 14, and the discharge of used fuel gas is not biased to a specific fuel gas outlet 45. Furthermore, the oxygen-containing gas spreads through the entirety of the cathode 15, and the discharge of used oxygen-containing gas is not biased to a specific oxygen-containing gas outlet 55. Consequently, during power-generation, a power-generation difference due to density difference in the fuel gas and in the oxygen-containing gas is less likely to arise on the surface of the electrolyte electrode assembly 12. Therefore, an increase in the durability of the electrolyte electrode assembly 12 can be expected.

The sandwiching section 21 of this embodiment includes a plurality of first projections 43 that touch the anode 14 provided near the fuel gas channel 41. The sandwiching section 21 also includes a plurality of second projections 53 that touch the cathode 15 provided near the oxygen-containing gas channel 51.

Consequently, the pluralities of first and second projections 43 and 53 obtain a superior power collection effect. In addition, circulation of the fuel gas and fuel exhaust gas along the fuel gas channel 41 between the first projections 43 can be enhanced. Circulation of oxygen-containing gas and oxygen-containing exhaust gas along the oxygen-containing gas channel 51 between the second projections 53 can also be enhanced.

(Second Embodiment)

Subsequently, a fuel cell according to a second embodiment will be explained. While in the first embodiment shown in FIG. 4, the fuel gas supply passage 24 formed in the fuel gas supply section 23 and the oxygen-containing gas supply passage 28 formed in the oxygen-containing gas supply section 27 are separately provided, in a second embodiment shown in FIG. 8 differs in that the fuel gas supply passage 24 and the oxygen-containing gas supply passage 28 are formed in a single fuel gas supply section 23. Parts having substantially same configuration as in the first embodiment are not repetitiously explained.

Figure 8:
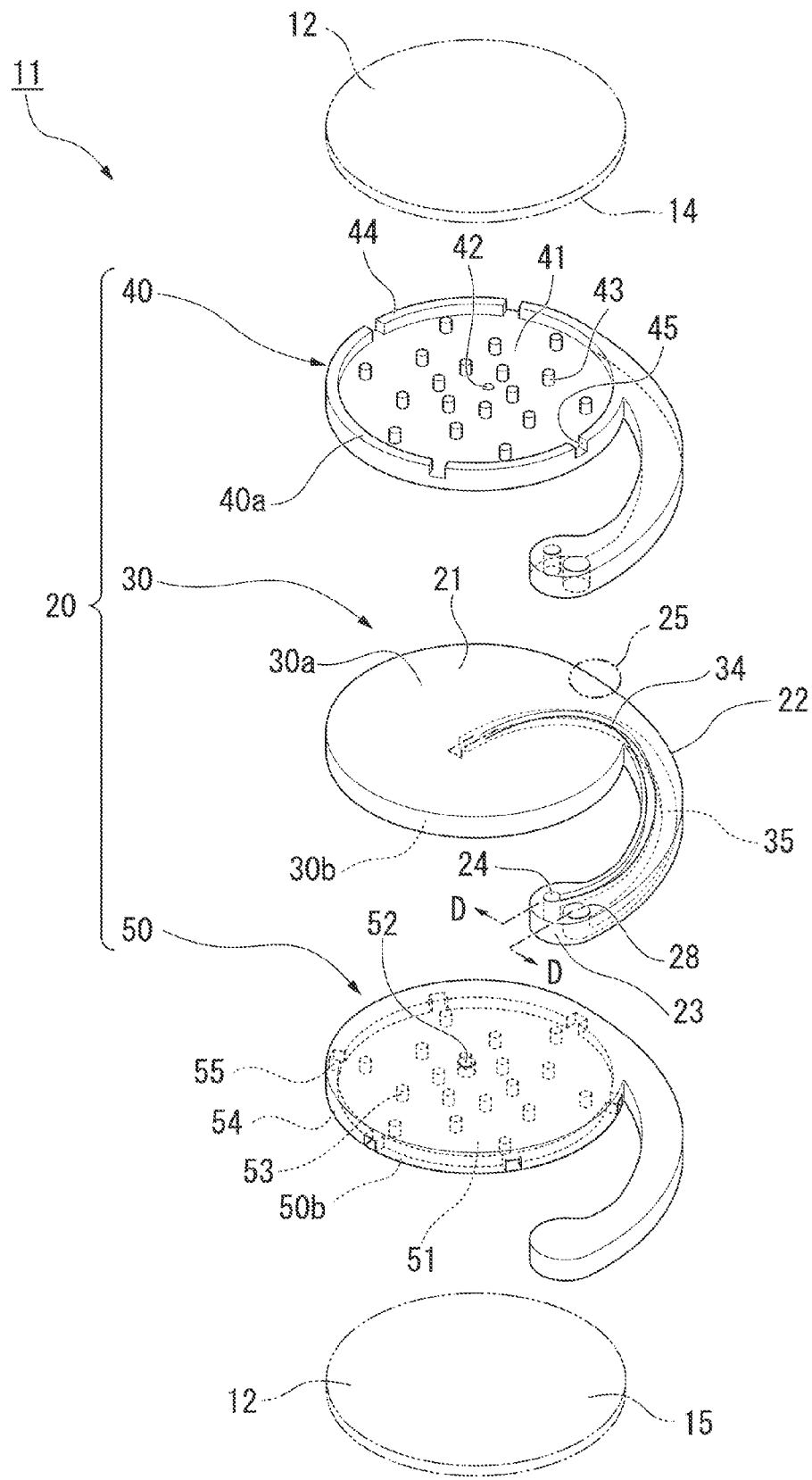
[FIG. 8]

FIG. 8 is an exploded perspective view of a fuel cell 11 according to the second embodiment. The cross-section along line D-D roughly matches FIG. 3B.

As shown in FIG. 8, in the separator 20 of this fuel cell 11, a single reactant gas bridge 22 extends from the sandwiching section 21. A single reactant gas supply section 23 is provided at the tip of the reactant gas bridge 22. A fuel gas supply passage 24 and an oxygen-containing gas supply passage 28 are formed alongside each other in the reactant gas supply section 23. As shown in FIGS. 3A to 3C, a seal material 18*a* is provided between reactant gas supply sections 23 of adjacent separators 20.

The separator 20 is formed by stacking a first plate 40, a second plate 50, and a third plate 30. A fuel gas supply channel 34 is formed in a top face 30*a* of the third plate 30 which faces the first plate 40, running from the fuel gas supply passage 24 and passing through the reactant gas bridge 22 to near the center of the sandwiching section 21. An oxygen-containing gas supply channel 35 is formed on a rear face 30*b* of the third plate 30 which faces the second plate 50, running from the oxygen-containing gas supply passage 28 and passing through the reactant gas bridge 22 to near the center of the sandwiching section 21.

A fuel gas channel 41 is formed in a top face 40*a* of the first plate 40 near the electrolyte electrode assembly 12. A fuel gas supply inlet 42 is formed near the center of the fuel gas channel 41, and communicates with the fuel gas supply channel 34 of the third plate 30. A plurality of projections 43 are formed inside the fuel gas channel 41, and a first circumferential protrusion 44 is formed around the fuel gas channel 41. In the first circumferential protrusion 44, a plurality of fuel gas outlets 45 are arranged spaced apart and radially in the circumferential direction.

An oxygen-containing gas channel 51 is formed in a rear face 50*b* of the second plate 50 near the electrolyte electrode assembly 12. An oxygen-containing gas supply inlet 52 is formed near the center of the oxygen-containing gas channel 51, and communicates with the oxygen-containing gas supply channel 35 of the third plate 30. A plurality of second projections 53 are formed inside the oxygen-containing gas channel 51, and a second circumferential protrusion 54 is formed around the oxygen-containing gas channel 51. A plurality of oxygen-containing gas outlets 55 are arranged spaced apart and radially in the second circumferential protrusion 54.

The reactant gas bridge 22 is a circular arc-shaped member having a radius that is larger than the radius of the sandwiching section 21; the base of the reactant gas bridge 22 connects to the sandwiching section 21, and its tip connects to the reactant gas supply section 23. At a connecting section 25 (see FIG. 9) that connects the tip side of the reactant gas bridge 22 to the circumferential edge of the sandwiching section 21, the tangential direction of the sandwiching section 21 is substantially same as the tangential direction of the reactant gas bridge 22. That is, the connecting section 25 between the reactant gas bridge 22 and the sandwiching section 21 has a smoothly continuous plane that does not protrude outside the diameter direction of the sandwiching section 21.

Similarly, in a connecting section 32 that connects the tip side of the reactant gas bridge 22 to the circumferential edge of the reactant gas supply section 23, the tangential direction of the reactant gas supply section 23 and the tangential direction of the reactant gas bridge 22 are substantially same.

Figure 9:
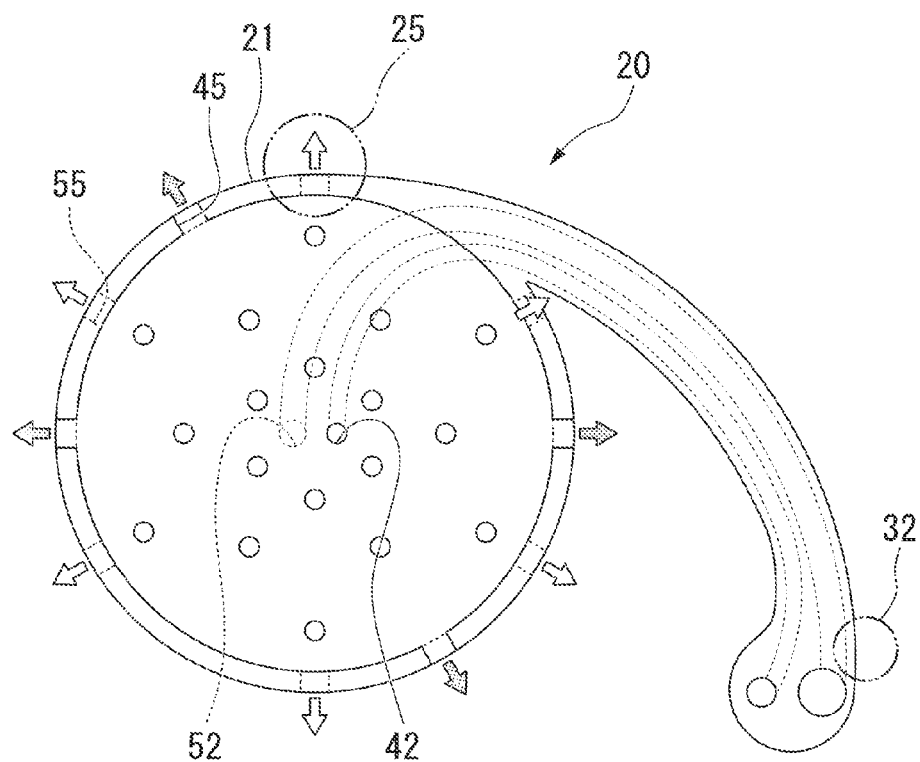
[FIG. 9]

FIG. 9 is a plan view of a separator 20. Fuel gas outlets 45 and oxygen-containing gas outlets 55 are arranged at different positions (such that their phases are different) in the circumferential direction of the sandwiching section 21.

Figure 6:
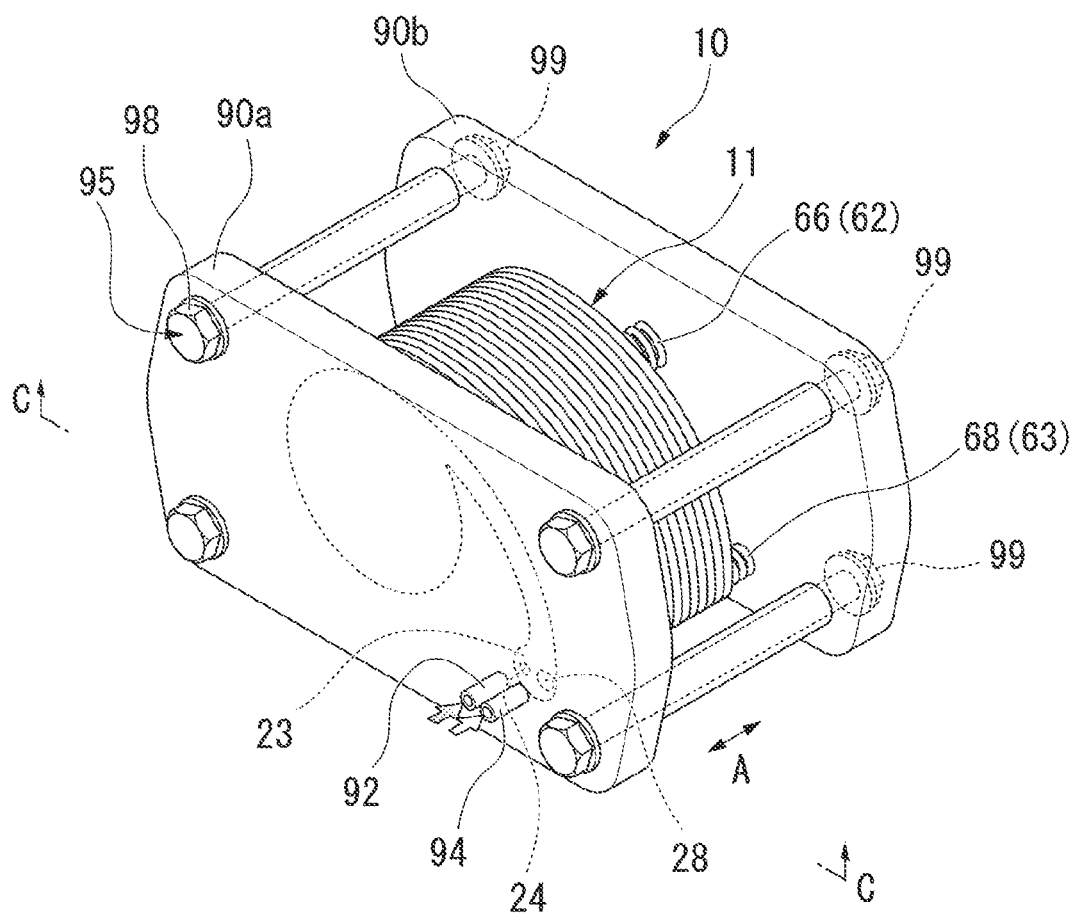
[FIG. 6]

FIG. 6 is an explanatory schematic perspective view of a fuel cell stack 10, showing a cross-sectional view along the line C-C of FIG. 1.

Figure 7:
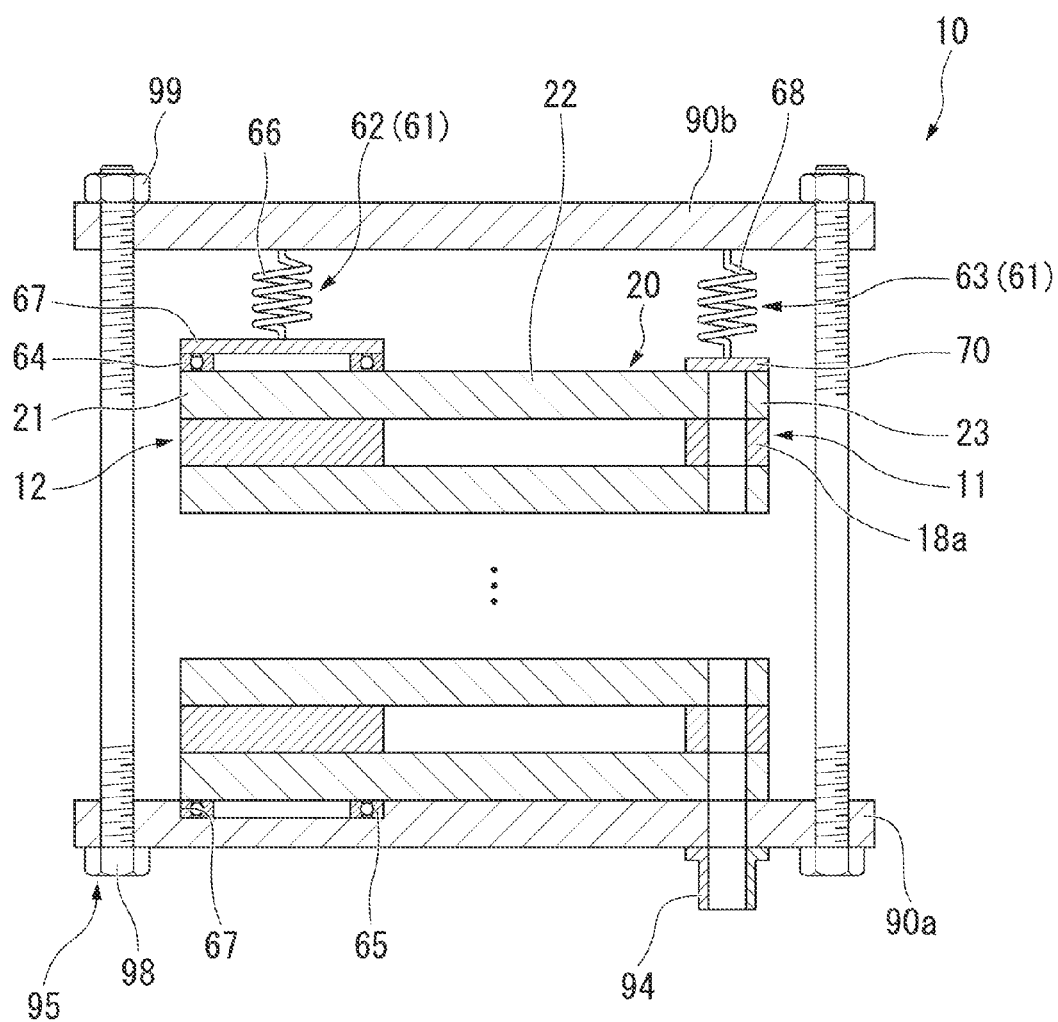
[FIG. 7]

As shown in FIGS. 6 and 7, a plurality of the fuel cells 11 are stacked in the direction of arrows A to form the fuel cell stack 10. The fuel cell stack 10 is sandwiched between a pair of end plates end plates 90a and 90b with a load-applying mechanism 61 in between, and the end plates 90a and 90b are connected via a fastening mechanism 95. As in the first embodiment, the load-applying mechanism 61 includes a first load-applying mechanism 62 that applies a load to the sandwiching section 21 and the electrolyte electrode assembly 12 of the fuel cell 11, and a second load-applying mechanism 63 that applies a load to the reactant gas supply sections 23 and 27.

The first load-applying mechanism 62 includes a pair of supporting members 64 and 65, which are arranged from the ends of the stacking direction of the fuel cell stack 10 with the sandwiching section 21 of the fuel cell 11 sandwiched between them, and a first load-applying mechanism 66, which is provided between the end plate 90b and the supporting member 64.

The second load-applying mechanism 63 includes a second load-applying mechanism 68, provided between the other end plate 90b and the reactant gas supply section 23 at the end of the stacking direction of the fuel cell stack 10. One end of the second load-applying mechanism 68 connects to the end plate 90b, and another end connects to a gasket 70 for sealing the reactant gas supply passages 24 and 28. The second load-applying mechanism 68 presses the reactant gas supply sections 23 towards the end plate 90a with the gasket 70 in between.

The end plate 90a includes a first pipe 92 that supplies fuel gas to the fuel cell stack 10, and a second pipe 94 that supplies oxygen-containing gas to the fuel cell stack 10. In the second embodiment, since the fuel gas supply passage 24 and the oxygen-containing gas supply passage 28 are formed alongside each other in the reactant gas supply section 23, the first pipe 92 and the second pipe 94 are also arranged alongside each other.

(Effects)

Effects of the fuel cell according to the second embodiment will be explained.

Fuel gas passes along the first pipe 92 shown in FIG. 6, the fuel gas supply passage 24, the fuel gas supply channel 34, the fuel gas supply inlet 42, and the fuel gas channel 41 shown in FIG. 8, and is supplied to the anode 14 where it is used in generating power. Fuel gas that was used in generating power is discharged to the outside of the anode 14 from the fuel gas outlets 45 formed in the first circumferential protrusion 44.

Oxygen-containing gas passes along the second pipe 94 shown in FIG. 6, and the oxygen-containing gas supply passage 28, the oxygen-containing gas supply channel 35, the oxygen-containing gas supply inlet 52, and the oxygen-containing gas channel 51 shown in FIG. 8, and is supplied to the cathode 15 where it is used in generating power. Oxygen-containing gas that was used in generating power is discharged outside the cathode 15 from the oxygen-containing gas outlets 55 formed in the second circumferential protrusion 54.

In the fuel cell 11 of this embodiment, since the reactant gas supply section 23 and the sandwiching section 21 are connected by the reactant gas bridge 22, the same effects as in the first embodiment can be obtained.

In this embodiment, in the connecting section 25 between the sandwiching section 21 and the reactant gas bridge 22, the tangential direction of the circumferential edge of the sandwiching section 21 and the tangential direction of the circumferential edge of the reactant gas bridge 22 are substantially same; in addition, the supporting members 64 and 65 are inserted so as to sandwich the fuel cell stack 10 from both ends of its stacking direction.

According to this configuration, when the fuel cell 11 is generating power, stress generated in the extending direction of the reactant gas bridge 22 acts in the tangential direction of the sandwiching section 21, and is converted into rotational force in the circumferential direction of the sandwiching section 21. Due to the rotational force acting on the sandwiching section 21, the sandwiching section 21 rotates around its central point, and can thereby absorb the rotational force acting on it.

Therefore, since warping of the separator 20 resulting from expansion and contraction due to heat can be suppressed, adhesion between the separator 20 and the electrolyte electrode assembly 12 can thereby be maintained, and power can be generated and collected efficiently. Moreover, since no unbalanced load from the separator 20 acts on the electrolyte electrode assembly 12, the durability of the electrolyte electrode assembly 12 can be increased, and damage to it can be prevented. Furthermore, since deformation of the reactant gas bridges 22 and 26 can be prevented, a desired quantity of reactant gas can be supplied to the electrolyte electrode assembly 12 at all times, thereby stabilizing the power generation efficiency.

Moreover, some of the stress generated in the extending directions of the reactant gas bridges 22 also acts on the reactant gas supply section 23. In this embodiment, since the tangential direction of the circumferential edge of the reactant gas bridge 22 is substantially same as the tangential direction of the circumferential edge of the reactant gas supply section 23, the stress generated in the extending direction of the reactant gas bridge 22 acts in the tangential direction of the reactant gas supply section 23, and is converted to a rotational force in the circumferential direction of the reactant gas supply section 23. Consequently, the stress acting on the reactant gas bridge 22 can be absorbed, and concentration of stress in the connecting sections 25 and 32 and the like can be suppressed. Therefore, warping of the separators 20 resulting from expansion and contraction due to heat can be further suppressed.

In this embodiment, the reactant gas supply section 23 and the sandwiching section 21 are connected via the reactant gas bridge 22.

Since the tightening load in the stacking direction via the reactant gas bridge 22 is thus shut off between the reactant gas supply section 23 and the sandwiching section 21, a desired load can be applied to the electrolyte electrode assembly 12. Consequently, it becomes possible, using a simple and compact configuration, to apply a comparatively large load to the fuel gas supply section 23, which demands sealability, and to apply a comparatively small load, being sufficient to increase adhesion with the sandwiching section 21, to the electrolyte electrode assembly 12. Therefore, a desired sealability can be ensured in the fuel gas supply section 23, and damage to the electrolyte electrode assembly 12 can be prevented as much as possible, thereby achieving efficient generation and collection of power.

The fuel gas supply channel 34 and the oxygen-containing gas supply channel 35 are formed in the reactant gas bridge 22. Therefore, the temperature difference between the fuel gas and the oxygen-containing gas is reduced before they are supplied to the electrolyte electrode assembly 12, enabling the electrolyte electrode assembly 12 to generate power stably.

Furthermore, the fuel gas supply passage 24 and the oxygen-containing gas supply passage 28 are formed in the reactant gas supply section 23. Therefore, the temperature difference between the fuel gas and the oxygen-containing gas is reduced before they are supplied to the electrolyte electrode assembly 12, enabling the electrolyte electrode assembly 12 to generate power stably.

In addition, the fuel gas supply passage 24 and the oxygen-containing gas supply passage 28, which both demand sealability, are integrated with the reactant gas supply section 23. Therefore, a desired sealability can be achieved in the reactant gas supply section 23, damage to the electrolyte electrode assembly 12 can be prevented as much as possible, and power can be generated and collected efficiently.

Furthermore, in this embodiment, as in the embodiment described earlier, the channel cross-section of the fuel gas is smaller than the channel cross-section of the oxygen-containing gas.

Consequently, the oxygen-containing gas and the fuel gas can be supplied without excess or deficiency, and it is possible to prevent fuel gas waste and a decrease in the temperature of the fuel cell 11. In a fuel cell 11 usually operating at A/F>1, the pressure difference and pressure loss difference between the fuel gas and the oxygen-containing gas decreases. As a result, oxygen-containing gas and other gases such as exhaust gas from outside the electrolyte electrode assembly 12 can be further prevented from entering the anode 14, and fuel gas and other gases such as exhaust gas from outside the electrolyte electrode assembly 12 can be further prevented from entering the cathode 15. This easily increases the durability of the separator 20 and the electrolyte electrode assembly 12.

(Third Embodiment)

Subsequently, a fuel cell according to a third embodiment will be explained. While in the first embodiment shown in FIG. 4, one sandwiching section 21 is provided for one separator 20, a third embodiment shown in FIG. 11 differs in that two sandwiching sections 21a and 21b are provided for one separator 20. Parts having substantially same configuration as in the first embodiment and the second embodiment will not be repetitiously explained.

Figure 11:
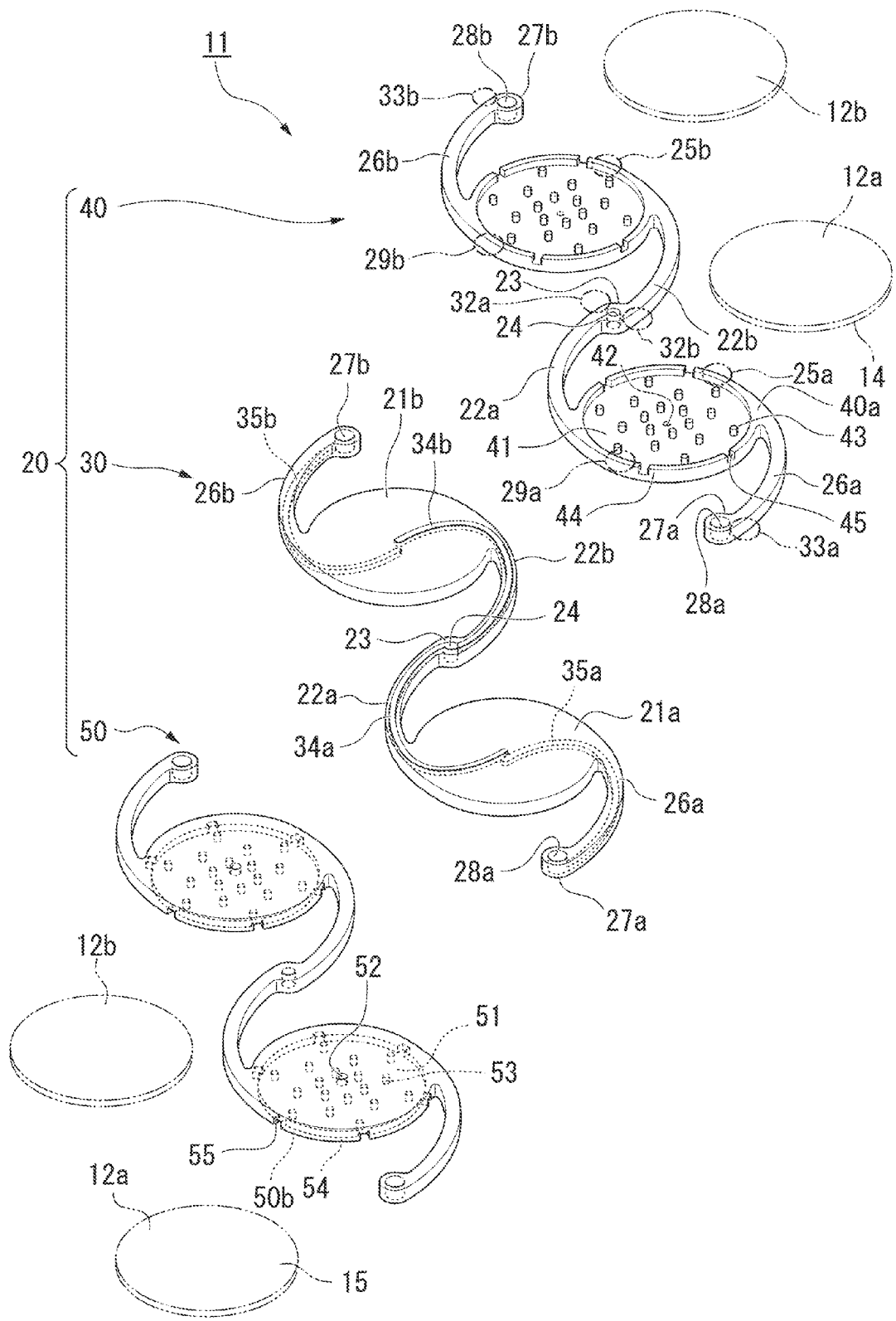
[FIG. 11]

FIG. 11 is an exploded perspective view of a fuel cell 11 according to a third embodiment.

As shown in FIG. 11, a separator 20 of the fuel cell 11 includes a pair of sandwiching sections 21a and 21b that sandwich a pair of electrolyte electrode assemblies 12a and 12b. In the first sandwiching section 21a, bases of reactant gas bridges 22a and 26a are connected, and in the second sandwiching section 21b, bases of reactant gas bridges 22b and 26b are connected. The reactant gas bridges 22a, 22b, 26a, and 26b extend such that they enclose the sandwiching sections 21a and 21b from positions that differ by 180 degrees in the circumferential direction of the circumferential edges of the sandwiching sections 21a and 21b (opposing positions with the sandwiching sections 21a and 21b in between).

Oxygen-containing gas supply sections 27a and 27b are connected on the tip sides of respective oxygen-containing gas bridges 26a and 26b of the sandwiching sections 21a and 21b, and the tip sides of the reactant gas bridges 22a and 22b are gathered and connected in the single reactant gas supply section 23. That is, the electrolyte electrode assemblies 12a and 12b of the separator 20 are connected via the reactant gas bridges 22a and 22b, and the reactant gas supply section 23.

In this case, the separator 20 is arranged in point-symmetrical formation with respect to a central point of the reactant gas supply section 23.

Connecting sections 25a, 25b, 29a, and 29b, which respectively connect the base sides of the reactant gas bridges 22a and 22b and the oxygen-containing gas bridges 26a and 26b to the circumferential edges of the sandwiching sections 21a and 21b, are connected such that the tangential directions of the sandwiching sections 21a and 21b are substantially same as the tangential directions of the oxygen-containing gas bridges 22a, 22b, 26a and 26b.

Similarly, connecting sections 32a, 32b, 33a, and 33b, which respectively connect the tip sides of the reactant gas bridges 22a, 22b, 26a, and 26b to the circumferential edges of the reactant gas supply sections 23, 27a, and 27b are connected such that the tangential directions of the reactant gas supply sections 23, 27a, and 27b are substantially same as the tangential directions of the reactant gas bridges 22a, 22b, 26a, and 26b. At the circumferential edge of the reactant gas supply section 23, the tip sides of the oxygen-containing gas bridges 26a and 26b are connected at positions differing by 180 degrees in the circumferential direction.

The separator 20 is formed by stacking a first plate 40, a second plate 50, and a third plate 30. On a top face 30a of the third plate 30 which faces the first plate 40, a fuel gas supply channel 34a runs from the fuel gas supply passage 24 and through the fuel gas bridge 22a to near the center of the sandwiching section 21a, and a fuel gas supply channel 34b runs from the fuel gas supply passage 24 and through the fuel gas bridge 22b to near the center of the sandwiching section 21b.

On a rear face 30b of the third plate 30 which faces the second plate 50, an oxygen-containing gas channel 35a runs from the oxygen-containing gas supply passage 28a and through the oxygen-containing gas bridge 26a to near the center of the sandwiching section 21a, and an oxygen-containing gas channel 35b runs from the oxygen-containing gas supply passage 28b and through the oxygen-containing gas bridge 26b to near the center of the sandwiching section 21b.

Fuel gas channels 41 are formed on the top faces 40a of the first plate 40 in the pair of sandwiching sections 21a and 21b. Fuel gas supply inlets 42 are formed near the centers of the fuel gas channels 41, and communicate with the fuel gas supply channels 34a and 34b of the third plate 30.

A plurality of first projections 43 are formed inside the fuel gas channel 41, and a first circumferential protrusion 44 is formed around the fuel gas channel 41. In the first circumferential protrusion 44, a plurality of fuel gas outlets 45 are arranged spaced apart and radially in the circumferential direction.

Oxygen-containing gas channels 51 are formed on each rear face 50b of the second plate 50 in the pair of sandwiching sections 21a and 21b. Oxygen-containing gas supply inlets 52 are formed near the centers of the oxygen-containing gas channels 51, and communicate with the oxygen-containing gas supply channels 35a and 35b of the third plate 30. A plurality of second projections 53 are provided in each oxygen-containing gas channel 51, and a second circumferential protrusion 54 is formed around each oxygen-containing gas channel 51. In each second circumferential protrusion 54, a plurality of oxygen-containing gas outlets 55 are arranged spaced apart and radially at an equiangular interval in the circumferential direction.

Figure 12:
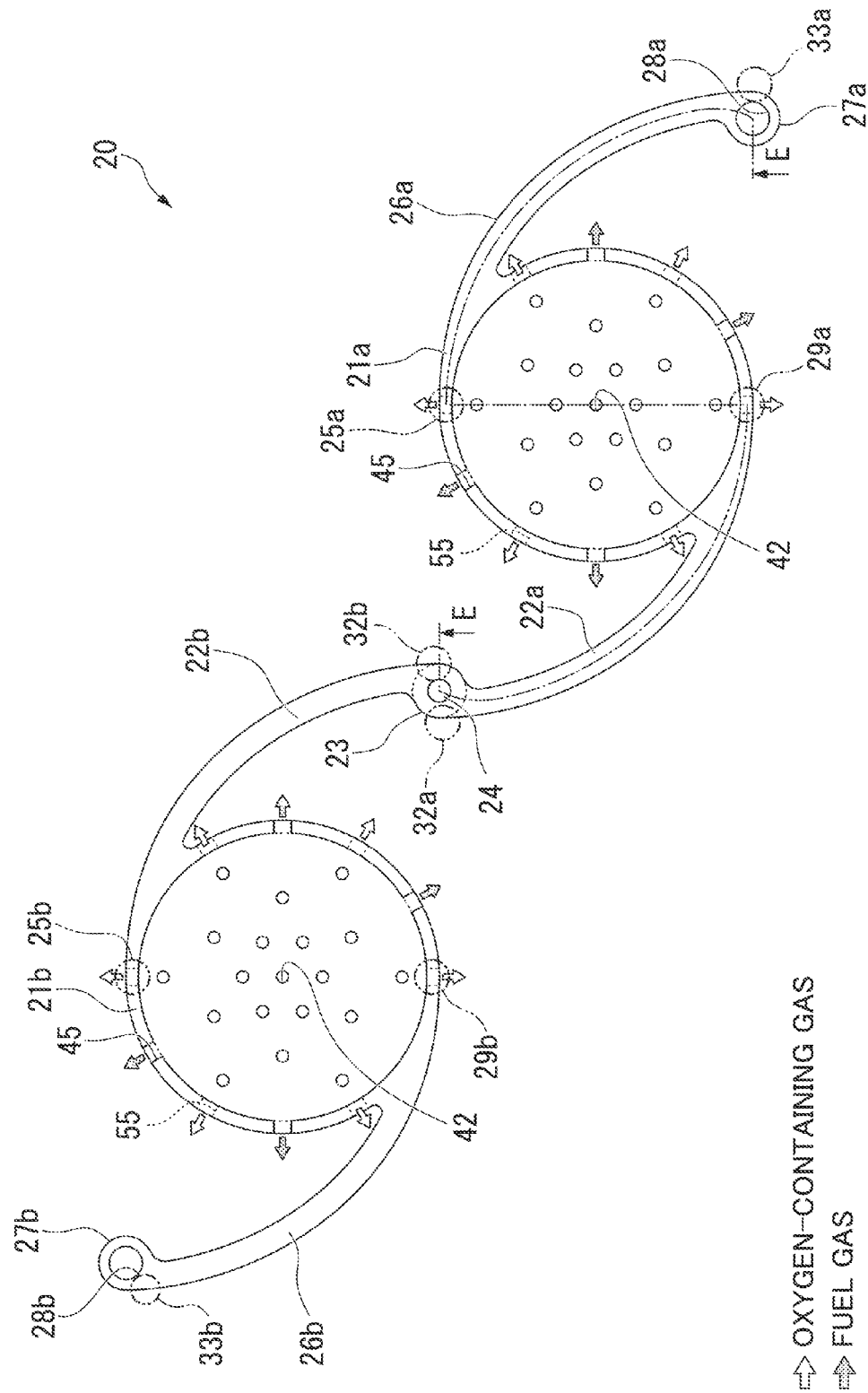
[FIG. 12]

FIG. 12 is a bottom view of a separator 20. The cross-section along line E-E roughly matches FIG. 3B.

As shown in FIG. 12, the fuel gas outlets 45 and the oxygen-containing gas outlets 55 are arranged at different positions (such that their phases differ) in the circumferential directions of the sandwiching sections 21a and 21b.

Figure 10:
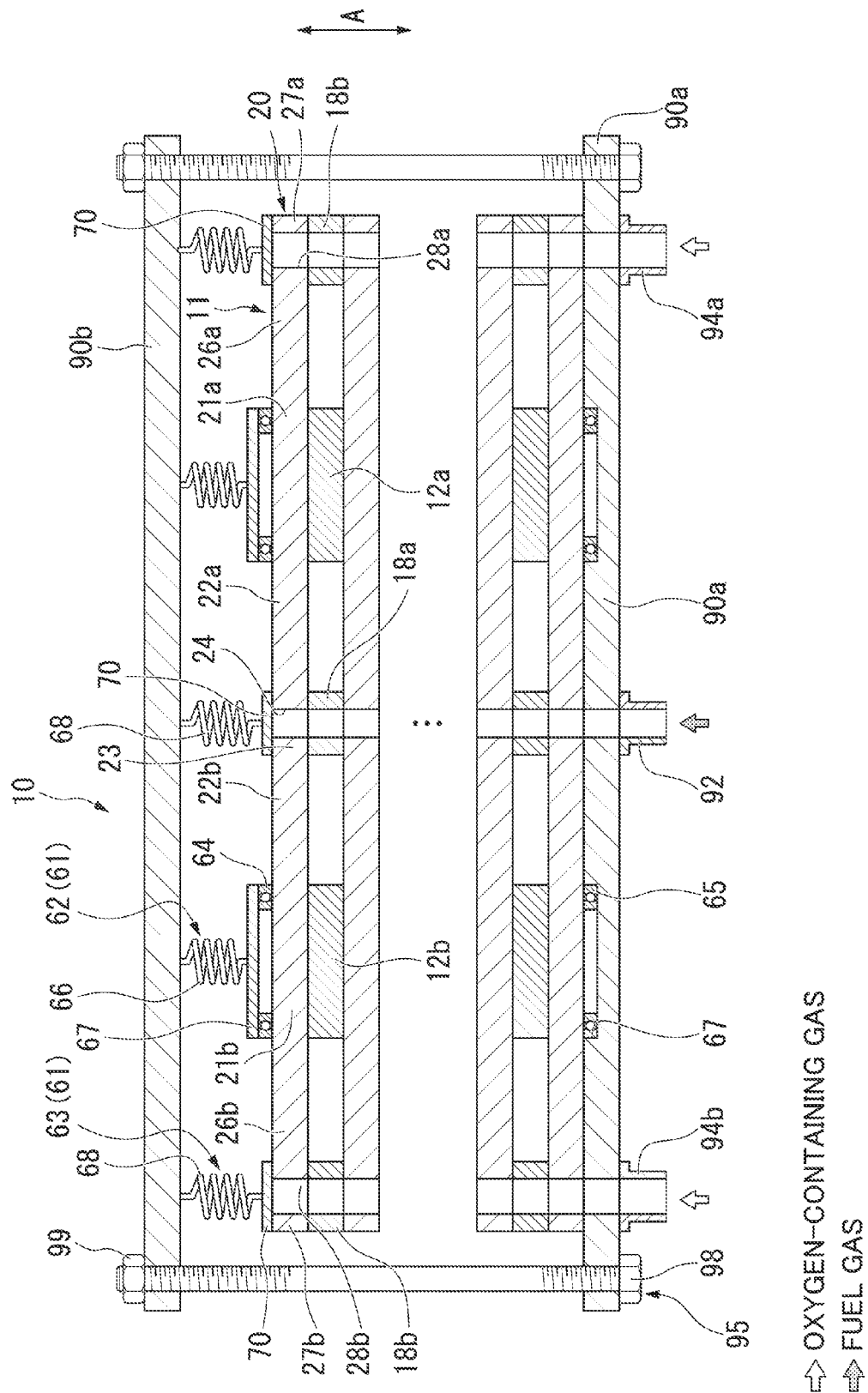
[FIG. 10]

FIG. 10 is a cross-sectional view of a fuel cell stack according to a third embodiment.

As shown in FIG. 10, a plurality of the above-described fuel cells 11 are stacked in the directions of arrows A to form a fuel cell stack 10. The fuel cell stack 10 is then sandwiched between a pair of end plates 90a and 90b with the load-applying mechanism 61 in between, and the end plates 90a and 90b are connected by fastening mechanism 95. The load-applying mechanism 61 includes a pair of first load-applying mechanisms 62, which apply loads to the electrolyte electrode assemblies 12a and 12b of the fuel cell 11, and three second load-applying mechanisms 63, which apply loads to each of the reactant gas supply sections 23, 27a, and 27b.

As in the first embodiment, the pair of first load-applying mechanisms 62 include a pair of supporting members 64 and 65, which are arranged from both ends of the stacking direction of the fuel cell stack 10 with the sandwiching sections 21a and 21b of the fuel cell 11 sandwiched between them, and a first load-applying mechanism 66, which is provided between the end plate 90b and the supporting members 64 and 65.

Also, as in the first embodiment, the second load-applying mechanism 63 includes second load-applying mechanism 68, which is provided between the reactant gas supply section 23 at the end part of the stacking direction of the fuel cell stack 10 and the other plate 90b. One end of the second load-applying mechanism 68 connects to the end plate 90b, and another end connects to a gasket 70 for sealing each of the reactant gas supply passages 24, 28a, and 28b. The second load-applying mechanism 68 presses the reactant gas supply sections 23, 27a, and 27b toward the end plate 90a with the gasket 70 in between.

A first pipe 92 that supplies fuel gas to the fuel cell stack 10, and second pipes 94a and 94b that supply oxygen-containing gas, are provided in the end plate 90a.

(Effects)

A fuel cell according to a third embodiment will be explained.

Fuel gas flows from the fuel gas supply passage 24 and the fuel gas supply channels 34a and 34b, shown in FIG. 11, passes through the fuel gas supply inlets 42 and the fuel gas channels 41 of the pair of sandwiching sections 21a and 21b, and is supplied to the anodes 14 of the pair of electrolyte electrode assemblies 12a and 12b, where it is used to generate power. Fuel gas that was used in generating power is discharged to the outside of the anode 14 from the fuel gas outlets 45 formed in the first circumferential protrusion 44.

Oxygen-containing gas flows from the oxygen-containing gas supply passages 28a and 28b to the oxygen-containing gas supply channels 35a and 35a, the oxygen-containing gas supply inlet 52. Then, the oxygen-containing gas is supplied to the oxygen-containing gas channel 51 for generating power. Oxygen-containing gas that was used in generating power is discharged outside the cathode 15 from the oxygen-containing gas outlets 55 formed in the second circumferential protrusion 54.

The fuel cell of this embodiment achieves the same effects as the first embodiment.

Moreover, in this embodiment, in the connecting sections 25a, 25b, 29a, and 29b, the tangential directions of the circumferential edges of the sandwiching sections 21a and 21b are substantially same as the tangential directions of the reactant gas bridges 22a, 22b, 26a, and 26b.

According to this configuration, when the fuel cell 11 is generating power, stress generated in the extending direction of the reactant gas bridges 22a and 26a acts in the tangential direction of the sandwiching section 21a, and is converted to rotational force in the circumferential direction of the sandwiching section 21a. Stress generated in the extending direction of the reactant gas bridges 22b and 26b acts in the tangential direction of the sandwiching section 21a, and is converted to rotational force in the circumferential direction of the sandwiching section 21b.

At the connecting sections 32a, 32b, 33a, and 33b, the tangential directions of the reactant gas supply sections 23, 27a, and 27b circumferential edges are substantially same as the tangential directions of the circumferential edges of the reactant gas bridges 22a, 22b, 26a, and 26b.

According to this configuration, some of the stress generated in the extending directions of the reactant gas bridges 22a and 22b acts in the tangential direction of the reactant gas supply section 23, and is converted into a rotational force in the circumferential direction of the reactant gas supply section 23. Also, some of the stresses generated in the extending directions of the oxygen-containing gas bridges 26a and 26b acts along the tangential directions of the oxygen-containing gas supply sections 27a and 27b respectively, and are converted into rotational forces in the circumferential directions of the oxygen-containing gas supply sections 27a and 27b.

Consequently, in the sandwiching sections 21a and 21b and the reactant gas supply sections 23, 27a, and 27b, since the stresses acting on the reactant gas bridges 22a, 22b, 26a, and 26b can be absorbed, it is possible to prevent stress from concentrating in the connecting sections 25a, 25b, 29a, 29b, 32a, 32b, 33a, 33b, etc. Therefore, distortion of the separator due to expansion and contraction caused by heat can be suppressed.

In this embodiment, the supporting members 64 and 65 are inserted so as to sandwich the fuel cell stack 10 from both ends of its stacking direction.

According to this configuration, when rotational forces act from the reactant gas bridges 22a, 22b, 26a, and 26b towards the sandwiching sections 21a and 21b, these rotational forces make the sandwiching sections 21a and 21b rotate. The rotational forces acting on the sandwiching sections 21a and 21b can thereby absorbed.

Therefore, since distortion of the separator due to expansion and contraction caused by heat can be suppressed, adhesion between the separator 20 and the electrolyte electrode assembly 12 can be maintained, and deformation of the reactant gas bridges 22a, 22b, 26a, and 26b can be prevented. Further, since the separator 20 exerts no unbalanced load onto the electrolyte electrode assembly 12, the durability of the electrolyte electrode assembly 12 can be increased. Moreover, since a desired quantity of reactant gas can be supplied to the electrolyte electrode assembly 12 at all times, power generation performance can be enhanced and the power generation efficiency can be stabilized.

Generally, the output of a fuel cell stack is proportionate to the number of its electrolyte electrode assemblies 12, and a fuel cell stack 10 for practical use requires a large number of them. Accordingly, the fuel cell 11 of the third embodiment includes a pair of sandwiching sections 21a and 21b for one separator 20, with a pair of electrolyte electrode assemblies 12a and 12b being sandwiched between adjacent separators 20. In comparison with the first embodiment, this enables the fuel cell stack 10 to be made smaller.

The fuel gas supply section 23 of this embodiment is provided in the center of the separator 20, and a plurality of electrolyte electrode assemblies 12a and 12b are arranged concentrically around the fuel gas supply section 23.

Since the fuel gas supply section 23 is provided in the center of the separator 20, fuel gas supplied to the fuel cell 11 can be well heated using heat generated by power-generation. This increases the thermal efficiency, and makes the fuel cell 11 better able to achieve thermal self-sustenance.

In addition, since the plurality of electrolyte electrode assemblies 12a and 12b are arranged concentrically around the fuel gas supply section 23, the fuel gas can be distributed uniformly from the fuel gas supply section 23 to the electrolyte electrode assemblies 12a and 12b, and their power generation performance can be enhanced and stabilized.

Particularly, since a single fuel gas supply section 23 can be used for the pair of sandwiching sections 21a and 21b, the supply mechanism of the fuel gas can be simplified and the manufacturing cost can be reduced.

Moreover, in this embodiment, when a plurality of fuel cells 11 are stacked, the electrolyte electrode assemblies 12a and 12b arranged concentrically in each fuel cell 11 are arranged in substantially same phase along the stacking direction of each fuel cell 11. That is, they are arranged at substantially same positions when viewed from the stacking direction of the fuel cell 11.

Consequently, since the load applied to the electrolyte electrode assemblies 12a and 12b is never insufficient, the adhesion between the electrolyte electrode assemblies 12a and 12b and the separator 20 is increased, and the power generated by the electrolyte electrode assemblies 12a and 12b can be collected efficiently.

The shapes of the sandwiching sections 21a and 21b of this embodiment correspond to the respective electrolyte electrode assemblies 12a and 12b, and the sandwiching sections 21a and 21b are arranged separately.

Since the shapes of the sandwiching sections 21a and 21b correspond to the electrolyte electrode assemblies 12a and 12b, they can efficiently collect the power generated by the electrolyte electrode assemblies 12a and 12b.

Moreover, since the sandwiching sections 21a and 21b are arranged separately, loads in the stacking direction can be applied independently to adjacent electrolyte electrode assemblies 12a and 12b. This makes it possible to absorb different loads generated in the electrolyte electrode assemblies 12a and 12b due to error in dimension of the electrolyte electrode assemblies 12a and 12b and the separator 20. Therefore, distortion can be prevented throughout the entire separator 20, and loads can be uniformly applied to the electrolyte electrode assemblies 12a and 12b. In addition, since thermal distortion and the like of the electrolyte electrode assemblies 12a and 12b is not transmitted to other adjacent electrolyte electrode assemblies 12a and 12b, there is no need to provide a special dimension-absorbing mechanism between the electrolyte electrode assemblies 12a and 12b. Therefore, the electrolyte electrode assemblies 12a and 12b can be arranged near each other, and the entire fuel cell 11 can easily be made smaller.

The fuel gas bridges 22 of this embodiment are spaced apart at an equiangular interval and arranged radially outward from the fuel gas supply sections 23a and 23b. This enables the fuel gas to be supplied uniformly from the fuel gas supply section 23 and via the reactant gas bridges 22a and 22b to the electrolyte electrode assemblies 12a and 12b, increasing the power generation performance and stability of the electrolyte electrode assemblies 12a and 12b.

In the separator 20 of this embodiment, the numbers of sandwiching sections 21a and 21b, fuel gas bridges 22a and 22b, and oxygen-containing gas bridges 26a and 26b, are set in correspondence with the number of electrolyte electrode assemblies 12a and 12b.

This enables the fuel gas to be supplied uniformly from the fuel gas supply section 23 and via the fuel gas bridges 22a and 22b and each of the sandwiching sections 21a and 21b to the electrolyte electrode assemblies 12a and 12b, increasing the power generation performance and stability of the electrolyte electrode assemblies 12a and 12b.

(Fourth Embodiment)

Subsequently, a fuel cell according to a fourth embodiment will be explained. While in the embodiment shown in FIG. 1, one sandwiching section 21 is provided for one separator 20, a fourth embodiment shown in FIG. 14 differs in that four sandwiching sections 21a to 21d are provided for one separator 20. Parts having substantially same configuration as in the first to the third embodiments will not be repetitiously explained.

Figure 14:
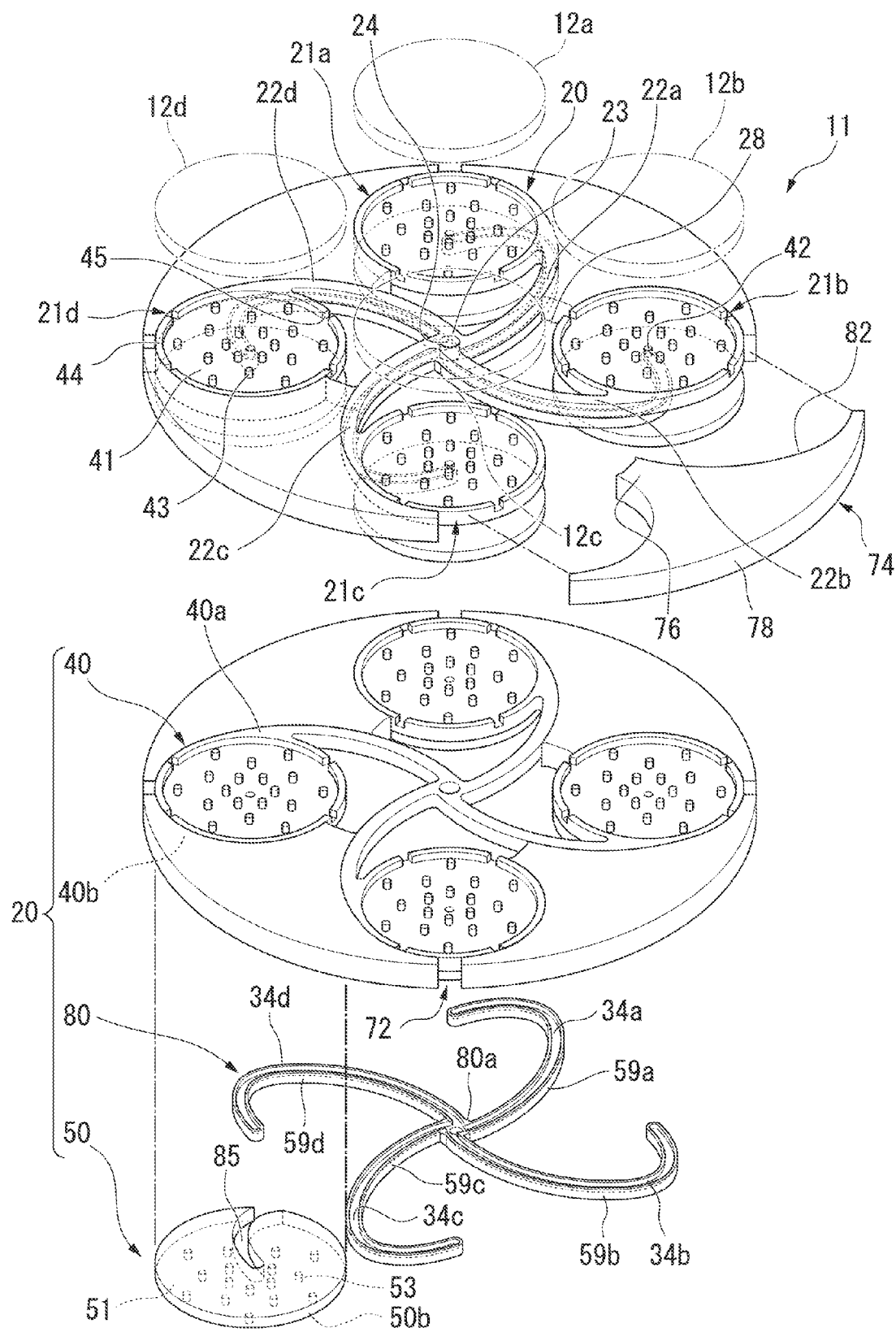
[FIG. 14]
Figure 15:
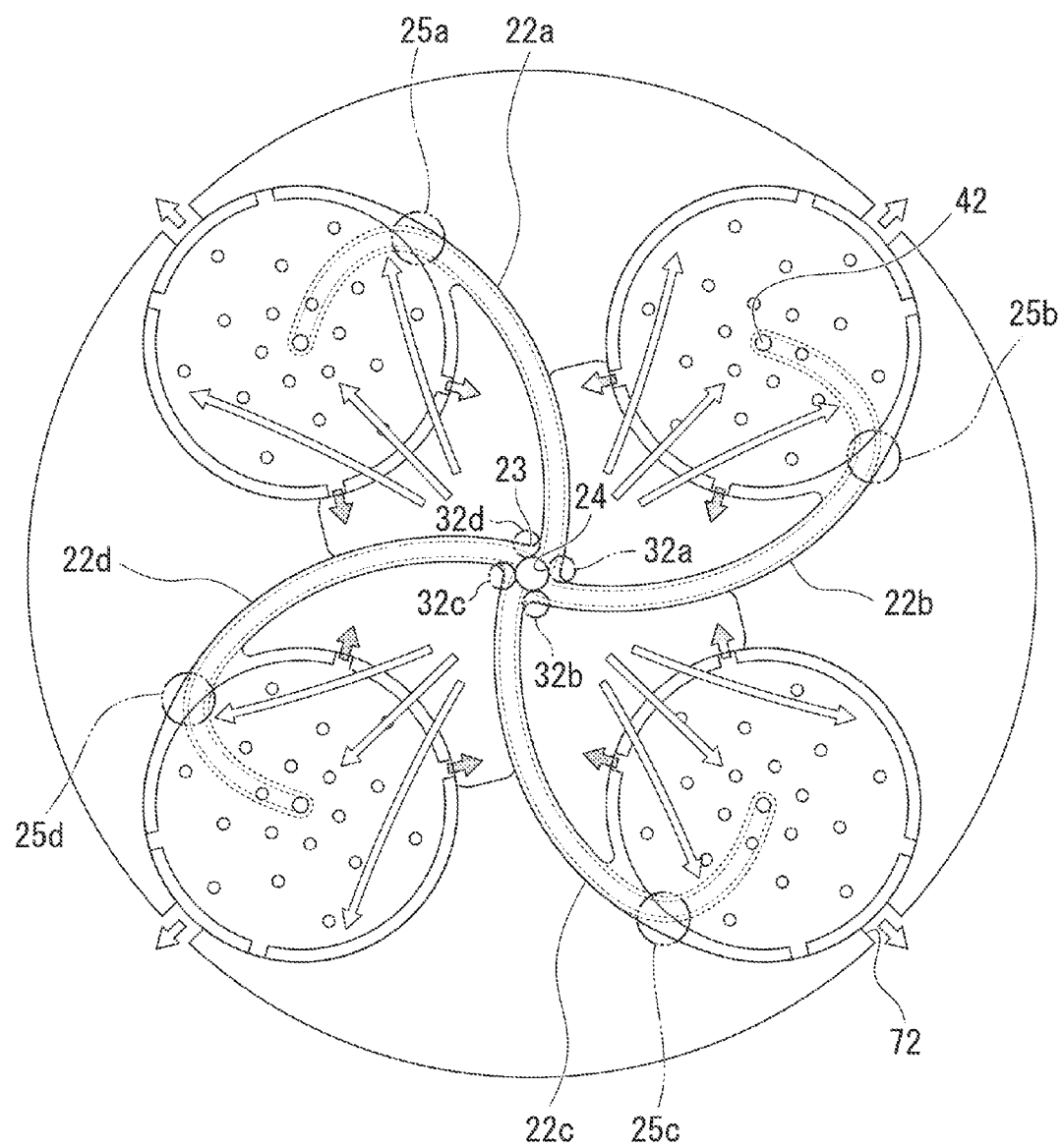
[FIG. 15]

FIG. 14 is an exploded perspective view of a fuel cell 11 according to a fourth embodiment, and FIG. 15 is a plan view.

As shown in FIGS. 14 and 15, a separator 20 of this fuel cell 11 includes four sandwiching sections 21a to 21d which sandwich electrolyte electrode assemblies 12a to 12d. One fuel gas supply section 23 is provided centrally and is enclosed by the four sandwiching sections 21a to 21d. Fuel gas bridges 22a to 22d respectively connect the fuel gas supply section 23 to the sandwiching sections 21a to 21d. That is, the fuel gas bridges 22a to 22d extend outwardly from the fuel gas supply section 23 and are spaced apart at equiangular intervals (intervals of 90 degree) in a radial formation; the sandwiching sections 21a to 21d are provided in a single body through these fuel gas bridges 22a to 22d. In connecting sections 25a to 25d between the base sides of the fuel gas bridges 22a to 22d and the circumferential edges of the respective sandwiching sections 21a to 21d, the tangential directions of the sandwiching sections 21a to 21d are substantially same as the tangential directions of the fuel gas bridges 22a to 22d. Similarly, connecting sections 32a to 32d between the tip sides of the fuel gas bridges 22a to 22d and the circumferential edge of the fuel gas supply section 23 are connected such that the tangential direction of the fuel gas supply section 23 is substantially same as the tangential directions of the fuel gas bridges 22a to 22d. In the center of the fuel gas supply section 23, a fuel gas supply passage 24 is formed in the stacking direction. The sandwiching sections 21a to 21d are formed in the shape of circular disks with roughly the same dimensions as the electrolyte electrode assembly 12, and are spaced apart.

The separator 20 is formed by stacking a first plate 40, four second plates 50, and a channel member 80.

In a top face 40a of the first plate 40 which faces the electrolyte electrode assemblies 12a to 12d, a fuel gas channel 41 is formed. A fuel gas supply inlet 42 is formed near the center of the fuel gas channel 41, and communicates with fuel gas supply channels 34a to 34d (described below) of the channel member 80. A plurality of first projections 43 are formed inside the fuel gas channel 41, and a first circumferential protrusion 44 is formed around the fuel gas channel 41. In the first circumferential protrusion 44, a plurality of fuel gas outlets 45 are arranged spaced apart and radially in the circumferential direction.

There are four second plates 50, one for each of the sandwiching sections 21a to 21d; the second plates 50 are substantially same shape as the sandwiching sections 21a to 21d, and are bonded to the rear faces 40b of the first plates 40. In a rear face 50b of each second plate 50 which faces the electrolyte electrode assembly 12, a plurality of second projections 53 are formed using a press or the like. On the rear face 50b of the second plate 50 having the second projections 53, an oxygen-containing gas channel 51 to which oxygen-containing gas is supplied along the electrode face of the cathode 15 is formed. A notch 85 is formed in the inner peripheral end of the second plate 50, and receives the channel member 80. The notch 85 is formed by cutting away a circular-arc shape from the inner peripheral end of the second plate 50 to near its center, such that the fuel gas supply inlet 42 of the first plate 40 is exposed when viewed from the rear face 50b of the second plate 50.

The channel member 80 is a flat plate having the shape of a reverse swastika in plan view, and is bonded to the rear face 40b of the first plate 40 by, for example, brazing, diffusion bonding, laser welding, etc. Specifically, the channel member 80 includes a fuel gas supply section 23 for forming a fuel gas supply passage 24, and bridges 59a to 59d that extend radially from the fuel gas supply section 23.

The bridges 59a to 59d are members shaped like circular arcs; they are longer than the fuel gas bridges 22a to 22d, and their tip ends are stored in the notches 85 of the second plates 50. The tip ends of the bridges 59a to 59d extend such that they cover the fuel gas supply inlets 42 in each of the sandwiching sections 21a to 21d. Fuel gas supply channels 34a to 34d are formed in top faces 80a of the bridges 59a to 59d which face the first plate 40. Specifically, the fuel gas supply channels 34a to 34d that communicate with the fuel gas supply inlets 42 are formed by using a method such as half-etching or machining to form grooves that run from the fuel gas supply passage 24 toward the tip sides of the bridges 59a to 59d. The channel member 80 is bonded to the rear face 40b of the first plate 40, sealing the upper openings of the fuel gas supply channels 34a to 34d.

The oxygen-containing gas channel 51 described above communicates with the oxygen-containing gas supply passage (oxygen-containing gas supply section) 28, which supplies oxygen-containing gas from between the inner peripheral ends of the electrolyte electrode assemblies 12a to 12d and the inner peripheral ends of the sandwiching sections 21a to 21d. This oxygen-containing gas supply passage 28 is provided between the inner side of the sandwiching sections 21a to 21d and the fuel gas bridges 22a to 22d, and extends in the stacking direction (direction of arrows A). That is, the oxygen-containing gas supply passage 28 is provided at four locations in correspondence with the electrolyte electrode assemblies 12a to 12d.

As in the embodiments already described, a seal material 18a (not shown) is provided between the separators 20.

Rectifying members 74 are provided between adjacent sandwiching sections 21a to 21d, and have functions such as rectifying the oxygen-containing gas that flows along the oxygen-containing gas channel 51 and the fuel gas that flows in along the fuel gas channel 41, and introducing the oxygen-containing gas that flowing along the oxygen-containing gas supply passage 28 into the oxygen-containing gas channel 51. The rectifying members 74 are substantially fan-shaped plates, and a predetermined number of them are stacked in the direction of arrows A, four being arranged in correspondence with the sandwiching sections 21a to 21d in plan view.

The rectifying members 74 are, for example, made by bonding mica with silicone resin, and they are arranged along part of the circumferential edges of the sandwiching sections 21a to 21d and part of the circumscribed circle of the separators 20. Specifically, one end (sealing section) of the rectifying member 74 is arranged between adjacent fuel gas bridges 22a to 22d, and another end, namely an outer peripheral section 78, constitutes part of the circumscribed circle of the separator 20. Circular arc sections 82 are then formed on both sides of the circumferential direction from the outer peripheral section 78 toward one end 76, so as to correspond with the outer peripheral shapes of the sandwiching sections 21a to 21d. The end 76 is arranged so as to seal the circumferential edge spaces of the sandwiching sections 21a to 21d, and the spaces enclosed by the end 76 and the fuel gas bridges 22a to 22d constitute the oxygen-containing gas supply passage 28. An exhaust gas channel 72 is formed between the peripheral parts 78 of adjacent rectifying members 74, and discharges exhaust gas from oxygen-containing gas that has flowed through the oxygen-containing gas channel 51.

Figure 13:
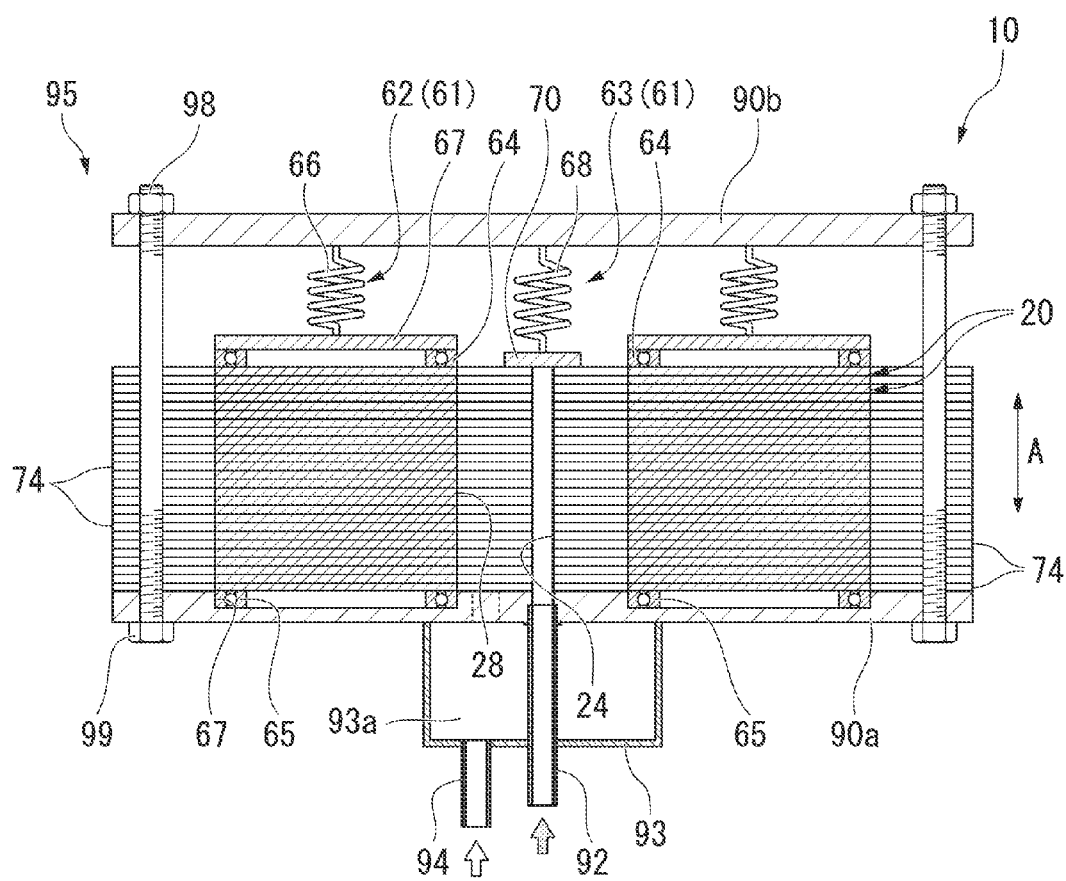
[FIG. 13]

FIG. 13 is a cross-sectional view of a fuel cell stack. In FIG. 13, the electrolyte electrode assemblies are not shown.

As shown in FIG. 13, the fuel cell stack 10 is sandwiched by a pair of end plates 90a and 90b with the load-applying mechanism 61 in between, the end plates 90a and 90b being connected by a fastening mechanism 95.

The end plate 90a includes a first pipe 92 that communicates with the fuel gas supply passage 24, a casing 93 having a cavity that communicates with each oxygen-containing gas supply passage 28, and a second pipe 94 that is connected to the casing 93 and communicates with the cavity 93a.

Fuel gas is supplied from the first pipe 92 connected to the end plate 90a to the fuel gas supply passage 24, and oxygen-containing gas is supplied from the second pipe 94 via the cavity 93a to each oxygen-containing gas supply passage 28.

The load-applying mechanism 61 includes four first load-applying mechanisms 62 that apply loads to the electrolyte electrode assemblies 12a to 12d of the fuel cell 11, and one second load-applying mechanism 63 that applies a load to the fuel gas supply section 23.

As in the first embodiment, the first load-applying mechanism 62 includes a pair of supporting members 64 and 65, which are arranged from the ends of the stacking direction of the fuel cell stack 10 with the sandwiching sections 21a to 21d of the fuel cell 11 sandwiched between them, and a first load-applying mechanism 66, which is provided between the end plate 90b and the supporting member 64.

As in the first embodiment, the second load-applying mechanism 63 includes a second load-applying mechanism 68, provided between the other end plate 90b and the reactant gas supply section 23 at an end of the stacking direction of the fuel cell stack 10. One end of the second load-applying mechanism 68 is connected to the end plate 90b, and another end connects to a gasket 70 for sealing the reactant gas supply passage 24. The second load-applying mechanism 68 press the reactant gas supply section 23 towards the end plate 90a with the gasket 70 in between.

Fuel gas moves along the fuel gas supply passage 24 of the fuel cell stack 10 in the stacking direction (direction of arrows A), while also moving along the surface of the fuel gas supply channel 34 provided in each fuel cell 11. The fuel gas passes from the fuel gas supply channel 34 into the fuel gas supply inlet 42 of each of the sandwiching sections 21a to 21d, and enters the fuel gas channel 41. Having entered the fuel gas channel 41, the fuel gas is supplied from the fuel gas supply inlet 42 to the approximate center of the anode 14, before moving along the fuel gas channel 41 towards a radial formation.

Meanwhile, oxygen-containing gas supplied through the oxygen-containing gas supply passage 28, under the rectifying effect of the rectifying member 74, flow in between the inner peripheral end of the electrolyte electrode assembly 12 and the inner peripheral ends of the sandwiching sections 21a to 21d, and is sent to the oxygen-containing gas channel 51. In the oxygen-containing gas channel 51, the oxygen-containing gas flows from the inner peripheral end of the cathode 15 of the electrolyte electrode assembly 12 (that is, the center of the separator 20) toward the outer peripheral end (that is, the outer peripheral end of the separator 20).

Therefore, in the electrolyte electrode assembly 12, the fuel gas is supplied from the center of the electrode face of the anode 14 toward the circumferential edge, while the oxygen-containing gas is supplied toward one direction on the electrode face of the cathode 15. Thus the fuel gas and the oxygen-containing gas are used to generate power. Incidentally, exhaust gas which contains mainly air after power-generation reaction, is discharged outside the electrolyte electrode assembly 12 from the exhaust gas channel 72 via the oxygen-containing gas channel 51. In this case, the fuel gas supplied to the fuel gas channel 41 is discharged from the fuel gas discharging outlets 45 to the oxygen-containing gas supply passage 28. Consequently, in the oxygen-containing gas supply passage 28, fuel gas contained in used exhaust gas reacts with part of the unused oxygen-containing gas, thereby heating the unused oxygen-containing gas. This makes it possible to supply pre-heated oxygen-containing gas to the oxygen-containing gas channel 51, achieving greater thermal efficiency.

The fuel cell 11 of this embodiment can obtain effects similar to those of the first to the third embodiments.

Particularly in this embodiment, in the connecting sections 25*a* to 25*d*, the tangential directions of the circumferential edges of the sandwiching sections 21*a* to 21*d* and the tangential directions of the circumferential edges of the fuel gas bridges 22*a* to 22*d* are substantially same.

According to this configuration, when the fuel cell 11 is generating power, stresses generated in the extending directions of the fuel gas bridges 22*a* to 22*d* act in the tangential directions of the respective sandwiching sections 21*a* to 21*d*, and are converted to rotational forces in the circumferential directions of the sandwiching sections 21*a* to 21*d*.

Also, stresses generated in the extending directions of the fuel gas bridges 22*a* to 22*d* act in the tangential direction of the fuel gas supply section 23, and are converted to rotational forces in the circumferential direction of the fuel gas supply section 23.

Consequently, in the sandwiching sections 21*a* to 21*d* and the fuel gas supply section 23, since stress acting on the fuel gas bridges 22*a* to 22*d* can be absorbed, stress can be prevented from being concentrated in the connecting sections 25*a* to 25*d*, the connecting sections 32*a* to 32*d*, and so on. Therefore, warping of the separators 20 resulting from expansion and contraction due to heat can be further suppressed.

Moreover, in this embodiment, the rectifying members 74 are provided between adjacent sandwiching sections 21*a* to 21*d*, and the spaces between each rectifying member 74 and the fuel gas bridges 22*a* to 22*d* form the oxygen-containing gas supply passage 28.

According to this configuration, unlike the embodiments described above, since there is no need to form an oxygen-containing gas supply passage 28 that penetrates the separators 20, the configuration can be simplified and manufacturing cost can be reduced. In this case, the oxygen-containing gas flowing along the oxygen-containing gas supply passage 28 does not leak from between the adjacent sandwiching sections 21*a* to 21*d*, and is reliably introduced into the oxygen-containing gas channel 51. Therefore, the oxygen-containing gas can be supplied without deficiency.

Moreover, the rectifying members 74 are arranged along part of the circumferential edges of the sandwiching sections 21*a* to 21*d* and part of the circumscribed circles of the separators 20. Consequently, the amount of oxygen-containing gas flowing from the oxygen-containing gas supply passage 28 to outside the sandwiching sections 21*a* to 21*d* can be satisfactorily suppressed; in addition, the rectifying members 74 do not protrude outwardly from the circumscribed circles of the separators 20, whereby the overall fuel cell 11 can easily be made smaller and more compact.

It is also possible to prevent heat generated when the electrolyte electrode assemblies 12*a* to 12*d* are generating power from being release outside the sandwiching sections 21*a* to 21*d*, increasing the thermal efficiency and facilitating thermal self-sustenance.

Furthermore, since this embodiment includes four second plates 50 having substantially same shape as the sandwiching sections 21*a* to 21*d*, and the bridges 59*a* to 59*d* of the channel member 80 are stored in notches 85 in each of the second plates 50, there is no need to use a third plate 30 with a reactant gas channel formed therein as in the first to the third embodiments. Therefore, the separators 20 can be made thinner, and the fuel cell stack 10 can be made compact.

The fuel gas supply section 23 of this embodiment is provided at the center of the separator 20, and the plurality of electrolyte electrode assemblies 12*a* to 12*d* are arranged concentrically around the fuel gas supply section 23.

Since the fuel gas supply section 23 is provided at the center of the separator 20, fuel gas that has not yet been supplied to the electrolyte electrode assemblies 12*a* to 12*d* can be successfully heated using heat generated by power generation, whereby the thermal efficiency can be increased and thermal self-sustenance can be enhanced.

Further, since the electrolyte electrode assemblies 12*a* to 12*d* are arranged concentrically around the fuel gas supply section 23, the fuel gas can be uniformly distributed and supplied to the electrolyte electrode assemblies 12*a* to 12*d*, and the power generation performance of the electrolyte electrode assemblies 12*a* to 12*d* can be increased and stabilized.

Moreover, the four electrolyte electrode assemblies 12*a* to 12*d* are arranged concentrically within the plane of the separator 20. Within a fuel cell structure wherein two or more electrolyte electrode assemblies 12*a* to 12*d* having substantially same shape and substantially same area are arranged concentrically within the plane of the separator 20, high occupancy can be obtained. In addition, the stack volume per power generation output is reduced, and the overall fuel cell stack 10 is easily made compact. Also, the stack surface area per power generation output can be reduced and heat radiation from the fuel cell stack 10 can be minimized, increasing the thermal efficiency and facilitating thermal self-sustenance.

In this embodiment, when a plurality of the fuel cells 11 are stacked, the electrolyte electrode assemblies 12*a* to 12*d* arranged concentrically around each fuel cell 11 are arranged in substantially same phase along the stacking direction of each fuel cell 11. That is, they are arranged at substantially same position when viewed from the stacking direction of the fuel cell 11.

Consequently, since the loads applied to the electrolyte electrode assemblies 12*a* to 12*d* are never insufficient, there is greater adhesion between the electrolyte electrode assemblies 12*a* to 12*d* and the separators 20, and the power generated by the electrolyte electrode assemblies 12*a* to 12*d* can be efficiently collected.

The sandwiching sections 21*a* to 21*d* of this embodiment have shapes that correspond to the respective electrolyte electrode assemblies 12*a* to 12*d*; in addition, the sandwiching sections 21*a* to 21*d* are spaced apart.

Since the sandwiching sections 21*a* to 21*d* are shaped in correspondence with the respective electrolyte electrode assemblies 12*a* to 12*d*, they can efficiently collect the power generated in the electrolyte electrode assemblies 12*a* to 12*d*.

Moreover, since the sandwiching sections 21a to 21d are spaced apart, they can independently apply loads in the stacking direction to adjacent electrolyte electrode assemblies 12a to 12d. Thus it becomes possible to absorb different loads generated in the electrolyte electrode assemblies 12a to 12d due to error in dimension of the electrolyte electrode assemblies 12a to 12d and the separators 20. Therefore, distortion can be prevented throughout the entire separators 20, and loads can be uniformly applied to the electrolyte electrode assemblies 12a to 12d. In addition, since thermal distortion and the like of each of the electrolyte electrode assemblies 12a to 12d is not transmitted to other adjacent electrolyte electrode assemblies 12a to 12d, there is no need to provide a special dimension-absorbing mechanism between the electrolyte electrode assemblies 12a to 12d. Thus, the electrolyte electrode assemblies 12a to 12d can be arranged near each other, and the entire fuel cell 11 can easily be made smaller.

The fuel gas bridges 22a to 22d of this embodiment are spaced apart at an equiangular interval and arranged radially outward from the fuel gas supply section 23.

This enables the fuel gas to be supplied uniformly from the fuel gas supply section 23 and via the reactant gas bridges 22a to 22d to the electrolyte electrode assemblies 12a to 12d, thereby increasing the power generation performance and stability of the electrolyte electrode assemblies 12a to 12d.

In the separator 20 of this embodiment, the numbers of the sandwiching sections 21a to 21d, and the fuel gas bridges 22a to 22d are set in correspondence with the number of electrolyte electrode assemblies 12a to 12d.

This enables the fuel gas to be supplied uniformly from the fuel gas supply section 23 and via the fuel gas bridges 22a to 22d to the electrolyte electrode assemblies 12a to 12d, thereby increasing the power generation performance and stability of the electrolyte electrode assemblies 12a to 12d.

In the separator 20 of this embodiment, the number of the oxygen-containing gas supply passages 28 is set in correspondence with the number of the electrolyte electrode assemblies 12a to 12d.

This enables the oxygen-containing gas to be distributed uniformly from the oxygen-containing gas supply passage 28 to the electrolyte electrode assemblies 12a to 12d, thereby increasing the power generation performance and stability of the electrolyte electrode assemblies 12a to 12d. The fuel gas supply section 23 of this embodiment is provided in the center of the separator 20, and the electrolyte electrode assemblies 12a to 12d are arranged concentrically around the fuel gas supply section 23.

Since the fuel gas supply section 23 is provided in the center of the separator 20, the fuel gas supplied to the fuel cell 11 is heated well by heat generated during power generation, thereby increasing the thermal efficiency and thermal self-sustenance of the fuel cell. Here, thermal self-sustenance denotes a state where the fuel cell maintains its operating temperature using only heat generated by itself, without heat being applied from the outside.

The technical field of the present invention is not limited to the embodiments described above, it being possible to make various modifications to these embodiments without departing from the main points of the invention. That is, the specific structures, shapes, and such like described in the embodiments are no more than examples, and can be modified where appropriate.

For example, while in the embodiments described above, the reactant gas bridges are formed in the shape of circular arcs, provided that the sandwiching section and each reactant gas bridge are connected such that their tangential directions are substantially same, the radii of the reactant gas bridges can be modified where appropriate. That is, it is acceptable to form the reactant gas bridges in the shape of straight lines (with the maximum radius of curvature).

The number of sandwiching sections, the number of reactant gas supply passages, and the like in one separator can also be modified to suit the design.

While in the embodiments described above, a coil spring is used as the load-applying mechanism of the load-applying mechanism, a plate spring or the like may be used instead.

Moreover, while in the embodiments described above, load-applying mechanisms (first load-applying mechanism and second load-applying mechanism) are provided between each reactant gas supply passage and the sandwiching section and the end plate, it is acceptable to provide a load-applying mechanism only between the end plate and the sandwiching section. In that case, a rigid body such as a bolt is preferably provided between the end plate and each reactant gas supply passage. This makes it possible to apply a comparatively large load to each reactant gas supply passage, while applying a comparatively small load, which is sufficient to increase the adhesion with the sandwiching section, to the electrolyte electrode assembly.

In regard to the first projections that touch the anode and the second projections that touch the cathode, the number of these that are arranged in substantially same phase in the stacking direction of the separator can be much larger than the number arranged in phases that are not the same substantially. That is, when viewed from the stacking direction, the number of the first projections and the second projections which overlap each other is greater than the number of them which do not overlap each other.

This ensures that a load in the stacking direction is reliably transmitted between the first projections and the second projections, increasing the adhesion between the electrolyte electrode assembly and the separator, and enabling the power generated by the electrolyte electrode assembly to be collected efficiently.

INDUSTRIAL APPLICABILITY

According to the present invention, it is possible to provide a fuel cell stack that can suppress distortion of the separator due to expansion and contraction caused by heat, and increase power-generation efficiency and durability. Therefore, the present invention has adequate industrial usability.

EXPLANATION OF REFERENCE

10 Fuel cell stack
11 Fuel cell
12, 12a, 12b, 12c, 12d, electrolyte electrode assemblies
13 Electrolyte
14 Anode
15 Cathode
20 Separator
21, 21a, 21b, 21c, 21d Sandwiching sections
22 Reactant gas bridge, fuel gas bridge
23 Reactant gas supply section, fuel gas supply section
24 Fuel gas supply passage
25, 25a, 25b, 25c, 25d, 29, 29a, 29b, 32, 32a, 32b, 32c, 32d, 33, 33a, 33b, Connecting sections
26 Reactant gas bridge, oxygen-containing gas bridge
27 Oxygen-containing gas supply section
28 Oxygen-containing gas supply passage
30 Third plate
34 Fuel gas supply channel
35 Oxygen-containing gas supply channel 40 First plate
41 fuel gas channel
42 Fuel gas supply inlet
43 First projections
44 First circumferential protrusion
45 Fuel gas outlets
50 Second plate
51 Oxygen-containing gas channel
52 Oxygen-containing gas supply inlet
53 Second projections
54 Second circumferential protrusion
55 Oxygen-containing gas outlets
61 Load-applying mechanism
64, 65 Supporting member
66 First load-applying mechanism
68 Second load-applying mechanism
74 Rectifying member

The invention claimed is:

1. A fuel cell stack in which electrolyte electrode assemblies are stacked alternately between adjacent separators in a stacking direction to form the fuel cell stack, each electrolyte electrode assembly including an anode, a cathode, and an electrolyte interposed between the anode and the cathode,
wherein the electrolyte electrode assemblies are sandwiched by sandwiching sections of adjacent separators,
wherein each sandwiching section includes a fuel gas channel that supplies fuel gas to an electrode face of the anode and a separately provided oxygen-containing gas channel that supplies oxygen-containing gas to an electrode face of the cathode, the fuel gas and the oxygen-containing gas being discharged after use from a circumferential edge of the electrolyte electrode assembly,
wherein the sandwiching section is formed in a shape of a circular disk;
wherein each of the separators further comprises:
a bridge that is connected to the sandwiching section and includes a reactant gas supply channel that supplies the fuel gas to the fuel gas channel or the oxygen-containing gas to the oxygen-containing gas channel;
a reactant gas supply section that is connected to the bridge and includes a reactant gas supply passage that supplies the fuel gas or the oxygen-containing gas to the reactant gas supply channel, the reactant gas supply passage being formed in a stacking direction of the separator; and
a connecting section that connects the sandwiching section to the bridge such that a tangential direction of a circumferential edge of the sandwiching section at the connecting section is substantially same as a tangential direction of a circumferential edge of the bridge at the connecting section,
wherein
the bridge is a circular arc shaped member having a radius that is larger than the radius of the sandwiching section, and
the connecting section between the sandwiching section and the bridge is formed as a smoothly continuous plane, and does not protrude outside the diameter direction of the sandwiching section.

2. The fuel cell stack according to claim 1, wherein the bridge and the reactant gas supply section are connected such that a tangential direction of a circumferential edge of the bridge is substantially same as a tangential direction of a circumferential edge of the reactant gas supply section.

3. The fuel cell stack according to claim 1, wherein:
the reactant gas supply section is formed in a shape of a circular disk; and
the radius of the bridge circular arc shaped member is larger than a radius of a circular arc of the reactant gas supply section.

4. The fuel cell stack according to claim 1, wherein the sandwiching section includes:
a fuel gas supply inlet that supplies the fuel gas to the fuel gas channel;
a first circumferential protrusion which is formed on a circumferential edge of the fuel-gas channel and contacts a circumferential edge of the anode;
fuel gas outlets that discharge the fuel gas from the fuel gas channel;
an oxygen-containing gas supply inlet that supplies the oxygen-containing gas to the oxygen-containing gas channel;
a second circumferential protrusion which is formed on a circumferential edge of the oxygen-containing gas channel and contacts a circumferential edge of the cathode; and
oxygen-containing gas outlets that discharge the oxygen-containing gas from the oxygen-containing gas channel,
the fuel gas outlets are arranged in point-symmetrical formation with respect to a central point of the sandwiching section, and
the oxygen-containing gas outlets are arranged in point-symmetrical formation with respect to the central point of the sandwiching section.

5. The fuel cell stack according to claim 4, wherein the fuel gas outlets and the oxygen-containing gas outlets are arranged in different phases.

6. The fuel cell stack according to claim 4, wherein the total opening sectional area of the fuel gas outlets is smaller than the total opening sectional area of the oxygen-containing gas outlets.

7. The fuel cell stack according to claim 4, wherein the number of the fuel gas outlets is smaller than the number of the oxygen-containing gas outlets.

8. The fuel cell stack according to claim 4, wherein the fuel gas outlets are spaced apart at an equiangular interval and arranged radially from the central point of the sandwiching section.

9. The fuel cell stack according to claim 4, wherein the oxygen-containing gas outlets are spaced apart at an equiangular interval and arranged radially from the central point of the sandwiching section.

10. The fuel cell stack according to claim 4, wherein the total opening sectional area of the fuel gas supply inlets is smaller than the total opening sectional area of the oxygen-containing gas supply inlets.

11. The fuel cell stack according to claim 4, wherein the number of the fuel gas supply inlets is smaller than the number of the oxygen-containing gas supply inlets.

12. The fuel cell stack according to claim 1, wherein the volume of the fuel gas channel is smaller than the volume of the oxygen-containing gas channel.

13. The fuel cell stack according to claim 1, wherein the sandwiching section includes a plurality of projections that touch the anode.

14. The fuel cell stack according to claim 1, wherein the sandwiching section includes a plurality of projections that touch the cathode.

15. The fuel cell stack according to claim 1, wherein
the sandwiching section includes a plurality of first projections that touch the anode, and a plurality of second projections that touch the cathode, the first projections and the second projections being arranged such that when viewed from the stacking direction, the number of the first projections and the second projections which overlap each other is greater than the number of them which do not overlap each other.

16. The fuel cell stack according to claim 1, wherein
the bridge comprises:
a fuel gas bridge that is connected to the sandwiching section and includes a fuel gas supply channel which supplies the fuel gas to the fuel gas channel; and
an oxygen-containing gas bridge that is connected to the sandwiching section and includes an oxygen-containing gas supply channel which supplies the oxygen-containing gas to the oxygen-containing gas channel,
the reactant gas supply section comprises:
a fuel gas supply section that is connected to the fuel gas bridge and includes a fuel gas supply passage which supplies the fuel gas to the fuel gas supply channel, the fuel gas supply passage being formed in the stacking direction; and
an oxygen-containing gas supply section that is connected to the oxygen-containing gas bridge and includes an oxygen-containing gas supply passage which supplies the oxygen-containing gas to the oxygen-containing gas supply channel, the oxygen-containing gas supply passage being formed in the stacking direction,
the fuel gas bridge and the oxygen-containing gas bridge are arranged in a point-symmetrical formation with respect to a central point of the sandwiching section, and
the fuel gas supply section and the oxygen-containing gas supply section are arranged in a point-symmetrical formation with respect to the central point of the sandwiching section.

17. The fuel cell stack according to claim 16, wherein
a total opening sectional area of the fuel gas supply channel is smaller than a total opening sectional area of the oxygen-containing gas supply channel.

18. The fuel cell stack according to claim 16, wherein
a total opening sectional area of the fuel gas supply passage is smaller than a total opening sectional area of the oxygen-containing gas supply passage.

19. The fuel cell stack according to claim 16, wherein:
the fuel gas supply section is provided at a center of the separator; and
a plurality of the electrolyte electrode assemblies are arranged concentrically around the fuel gas supply section.

20. The fuel cell stack according to claim 19, wherein
the electrolyte electrode assemblies are arranged in substantially same phase when viewed from the stacking direction.

21. The fuel cell stack according to claim 19, wherein:
the sandwiching sections have shapes corresponding to the electrolyte electrode assemblies; and
the sandwiching sections are arranged separately from each other.

22. The fuel cell stack according to claim 19, wherein
the fuel gas bridges are spaced apart at an equiangular interval and arranged radially outward from the fuel gas supply section.

23. The fuel cell stack according to claim 16, wherein
in the separator, each number of the sandwiching section, the fuel gas bridge, and the oxygen-containing gas bridge corresponds to the number of the electrolyte electrode assemblies.

24. The fuel cell stack according to claim 1, wherein:
the bridge is connected to the sandwiching section, and is formed with a fuel gas supply channel that supplies the fuel gas to the fuel gas channel and an oxygen-containing gas supply channel that supplies the oxygen-containing gas to the oxygen-containing gas channel; and
the reactant gas supply section is connected to the bridge, and is formed with a fuel gas supply passage that supplies the fuel gas to the fuel gas supply channel and an oxygen-containing gas supply passage that supplies the oxygen-containing gas to the oxygen-containing gas supply channel, the fuel gas supply passage and the oxygen-containing gas supply passage being arranged along the stacking direction.

25. The fuel cell stack according to claim 24, wherein
a total opening sectional area of the fuel gas supply channel is smaller than a total opening sectional area of the oxygen-containing gas supply channel.

26. The fuel cell stack according to claim 24, wherein
a total opening sectional area of the fuel gas supply passage is smaller than a total opening sectional area of the oxygen-containing gas supply passage.

27. The fuel cell stack according to claim 1, wherein:
the bridge includes a fuel gas bridge that is connected to the sandwiching section and includes a fuel gas supply channel that supplies the fuel gas to the fuel gas channel;
the reactant gas supply section includes a fuel gas supply section that is connected to the fuel gas bridge and includes a fuel gas supply passage that supplies the fuel gas to the fuel gas supply channel in the stacking direction;
a plurality of the electrolyte electrode assemblies are arranged concentrically around the fuel gas supply section, the number of the sandwiching sections and the fuel gas bridges corresponding to the number of the electrolyte electrode assemblies;
a rectifying member that guides the oxygen-containing gas into the oxygen-containing gas channel is provided between adjacent sandwiching sections;
the rectifying member includes a sealing part that seals adjacent sandwiching sections in the surface of the separator; and
a space enclosed by the sealing part and a circumferential edge of the separator constitutes an oxygen-containing gas supply section that makes the oxygen-containing gas flow in the stacking direction, and supplies the oxygen-containing gas to the oxygen-containing gas channel.

28. The fuel cell stack according to claim 16, wherein:
the fuel gas supply section is arranged in a center of the separator; and
four of the electrolyte electrode assemblies are arranged concentrically around the fuel gas supply section.

29. The fuel cell stack according to claim 1, further comprising a load-applying mechanism that applies a load in the stacking direction to each of the electrolyte electrode assemblies, the load-applying mechanism being set so as to apply a load in the stacking direction applied near the reactant gas supply section that is greater than a load applied to the electrolyte electrode assembly.

30. The fuel cell stack according to claim 29, wherein the load-applying mechanism includes:
- a first load-applying mechanism that applies a load in the stacking direction to the electrolyte electrode assembly; and
- a second load-applying mechanism that applies a load in the stacking direction to near the reactant gas supply section, and the load applied from the second load-applying mechanism to near the reactant gas supply section is greater than the load applied from the load-applying mechanism to the electrolyte electrode assembly.

31. The fuel cell stack according to claim 29, wherein the load-applying mechanism absorbs stress that is generated in a surface of the bridge, as rotational force in the circumferential direction of the separator in the sandwiching section.

32. The fuel cell stack according to claim 31, wherein the load-applying mechanism includes a supporting member that rotationally supports the sandwiching section at the surface of the separator.

33. The fuel cell stack according to claim 1, wherein the fuel cell is a solid oxide fuel cell.

* * * * *